US00RE50797E

(19) United States
(12) Reissued Patent
Calloway et al.

(10) Patent Number: US RE50,797 E
(45) Date of Reissued Patent: Feb. 17, 2026

(54) CABLE BROOM

(71) Applicant: Old Dominion Brush Company, Henrico, VA (US)

(72) Inventors: Britt R. Calloway, Midlothian, VA (US); Robert Mayes, Hanover, VA (US); Tim Stumph, Midlothian, VA (US); Chris Turner, Aylett, VA (US)

(73) Assignee: Old Dominion Brush Company, Henrico, VA (US)

(21) Appl. No.: 19/179,461

(22) Filed: Apr. 15, 2025

Related U.S. Patent Documents

Reissue of:
(64) Patent No.: 11,751,677
Issued: Sep. 12, 2023
Appl. No.: 17/816,278
Filed: Jul. 29, 2022

U.S. Applications:
(63) Continuation of application No. 17/353,321, filed on Jun. 21, 2021, now Pat. No. 11,399,623.

(60) Provisional application No. 63/116,450, filed on Nov. 20, 2020.

(51) Int. Cl.
*A46B 9/06* (2006.01)
*A46B 9/02* (2006.01)
*A46B 13/00* (2006.01)

(52) U.S. Cl.
CPC ..... *A46B 9/06* (2013.01); *A46B 9/02* (2013.01); *A46B 13/008* (2013.01); *A46B 2200/3066* (2013.01)

(58) Field of Classification Search
CPC .. E01H 1/053; E01H 1/02; E01H 1/05; A46B 3/14; A46B 13/08; A46B 9/08; A46B 9/02; A46B 13/008; A46B 2200/3066; A46B 3/00; A46B 3/16; A46B 7/04
See application file for complete search history.

(56) References Cited

U.S. PATENT DOCUMENTS 3,050,763 A * 8/1962 Martin ..... A46B 13/008 15/159.1
3,353,201 A * 11/1967 Horton ..... A46B 13/008 15/198

(Continued)

FOREIGN PATENT DOCUMENTS

GB 2465381 A 5/2010
JP S 47-036942 Y 12/1969

(Continued)

OTHER PUBLICATIONS

International Search Report and Written Opinion of the International Searching Authority directed to International Patent Application No. PCT/US2021/060119, mailed Feb. 23, 2022; 11 pages.

*Primary Examiner* — Terrence R Till
(74) *Attorney, Agent, or Firm* — Sterne, Kessler, Goldstein & Fox P.L.L.C.

(57) ABSTRACT

A gutter broom is provided. The gutter broom can include one or more block segments, each block segment having openings in which bristles are positioned. The bristles can have a first stiffness or a second stiffness different than the first stiffness. Bristles having the second stiffness can be positioned radially outward of bristles having the first stiffness on a block segment.

35 Claims, 19 Drawing Sheets

-Amended-

(56) References Cited

U.S. PATENT DOCUMENTS

| | | | | |
|---|---|---|---|---|
| 4,771,498 | A * | 9/1988 | Torta | A47L 11/4038 15/49.1 |
| 6,134,740 | A | 10/2000 | Torres et al. | |
| 6,457,202 | B1 | 10/2002 | Torres et al. | |
| 9,783,942 | B1 * | 10/2017 | Stell | E01H 1/04 |
| 10,244,859 | B2 | 4/2019 | Robertson et al. | |
| 11,399,623 | B2 | 8/2022 | Calloway et al. | |
| 11,751,677 | B2 | 9/2023 | Calloway et al. | |
| 2003/0172484 | A1 * | 9/2003 | Lendabarker | A46B 3/00 15/179 |
| 2017/0311708 | A1 * | 11/2017 | Robertson | A46B 3/14 |
| 2022/0160120 | A1 | 5/2022 | Calloway et al. | |
| 2022/0361660 | A1 | 11/2022 | Calloway et al. | |

FOREIGN PATENT DOCUMENTS

| | | | | |
|---|---|---|---|---|
| JP | S58-73140 | U | 5/1983 | |
| JP | S 62-034511 | A | 2/1987 | |
| JP | H 07-300831 | A | 11/1995 | |
| JP | 2003-135152 | A | 5/2003 | |
| WO | WO-2004086905 | A1 * | 10/2004 | A46B 13/008 |

* cited by examiner

-Amended-

-Amended-

-Amended-

CABLE BROOM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application is a *reissue application of U.S. Pat. No. 11,751,677, which issued from U.S. application Ser. No. 17/816,278, filed Jun. 29, 2022, which is a* continuation of U.S. application Ser. No. 17/353,321, filed Jun. 21, 2021, *now U.S. Pat. No. 11,399,623,* which claims benefit of and priority to U.S. Provisional Patent App. No. 63/116,450, filed Nov. 20, 2020, [both] *all* of which are incorporated herein by reference in their entirety for all purposes.

FIELD

The present disclosure relates to sweepers for cleaning surfaces. In particular, gutter brooms for cleaning roads, streets, and other surfaces.

BACKGROUND

Sweepers can be used to remove debris and particulate matter from various surfaces. In particular, a gutter broom can be used to clean roads, streets, and other surfaces and can be mounted onto a surface cleaning vehicle to move across the surface. The gutter broom can also approach a curb or a side of a building to remove debris. The gutter broom can include a brush mount that receives bristles for sweeping.

BRIEF SUMMARY

One aspect provides a block segment for a gutter broom. The block segment can include an array having rows and columns of openings to receive bristles. The bristles can include first bristles having a first stiffness and second bristles having a second stiffness greater than the first stiffness. The second bristles can be positioned alternately in openings in a given row and can be radially outward of the first bristles in a given column. The opening can extend through the block segment in a thickness direction from a top surface of the block segment to a bottom surface of the block segment. The block segment can also include a wall extending transversely within the opening. The bristles can be positioned in the opening and surrounding the wall to form a U-shape around the wall such that a first side of the bristles and a second side of the bristles are positioned on opposite sides of the wall.

In an aspect, the second bristles can have a second cross-sectional area greater than a first cross-sectional area of the first bristles. In an aspect, the first bristles can have a first cross-sectional area of a first geometry, the second bristles have a second cross-sectional area of a second geometry. In this aspect, the first geometry and the second geometry can be different. In an aspect, the second bristles can have a second diameter greater than a first diameter of the first bristles. In an aspect, the block segment can further include a bristle receptacle attached to the block segment. In this aspect, the bristle receptacle can include the opening in which second bristles are positioned. In an aspect, the bristle receptacle can be integral to the block segment. In an aspect, the first bristles can include a first material having a first elasticity, and the second bristles can include a second material having a second elasticity. In a further aspect, the first elasticity can be greater than the second elasticity. In a further aspect, the first elasticity and the second elasticity can be approximately equal. In an aspect, the second bristles can include at least one of an outer layer, a coating, and a rib. In an aspect, the first bristles and the second bristles can include steel. In an aspect, the opening can extend through the block segment in the thickness direction from the top surface of the block segment to the bottom surface of the block segment at an angle from an axis generally parallel to a central axis of the gutter broom. The bristles can extend outwardly from the bottom surface of the block segment at the angle. In an aspect, the first bristles can be positioned generally adjacent to the second bristles.

Another aspect provides a block segment for a gutter broom. The block segment can include an array having a row and a column and bristles positioned in the array. The bristles can include first bristles having a first stiffness and second bristles having a second stiffness greater than the first stiffness. The second bristles can be positioned consecutively in the row and radially outward of the first bristles in a given column. The block segment can also include an opening arranged in the array to receive the bristles. The opening can extend through the block segment in a thickness direction from a top surface of the block segment to a bottom surface of the block segment. The block segment can also include a wall extending transversely within the opening. The bristles can be positioned in the opening and surrounding the wall to form a U-shape around the wall such that a first side of the bristles and a second side of the bristles are positioned on opposite sides of the wall. In an aspect, the block segment can further include approximately 20 to approximately 40 openings, and approximately four to approximately eight second bristles can be positioned in the openings. In a further aspect, the approximately four to approximately eight second bristles can be positioned consecutively in the row. In an aspect, the first bristles can be positioned in the remaining openings. In a further aspect, each of the second bristles can be positioned generally adjacent to at least one first bristles. In another aspect, each of the first bristles can be generally adjacent to at least one other of the first bristles.

Another aspect provides a gutter broom. The gutter broom can include one or more block segments. Each block segment can include bristles. The bristles can include at least one of first bristles having a first stiffness and a first cross-sectional geometry and second bristles having a second stiffness different than the first stiffness and a second cross-sectional geometry different than the first cross-sectional geometry. The block segment can include an opening to receive bristles, the opening extending through the block segment in a thickness direction from a top surface of the block segment to a bottom surface of the block segment; and a wall extending transversely within the opening, the bristles positioned in the opening and surrounding the wall to form a U-shape around the wall such that a first side of the bristles and a second side of the bristles are positioned on opposite sides of the wall. In an aspect, the gutter broom can include approximately two to approximately five block segments. In a further aspect, at least two block segments can be different.

Another aspect provides a modified block segment. The modified block segment can include a bristle receptacle to receive a bristle segment. The bristle receptacle can be internal to an outer edge of the block segment. The modified block segment can be formed during an injection mold process, for example, by placing an insert in the tooling. The insert can include a cavity to form the bristle receptacle and receive the bristle segment.

BRIEF DESCRIPTION OF THE DRAWINGS/FIGURES

The accompanying drawings, which are incorporated herein and form part of the specification, illustrate aspects and, together with the description, further serve to explain the principles of the aspects and to enable a person skilled in the relevant art(s) to make and use the aspects.

Figure 1A:
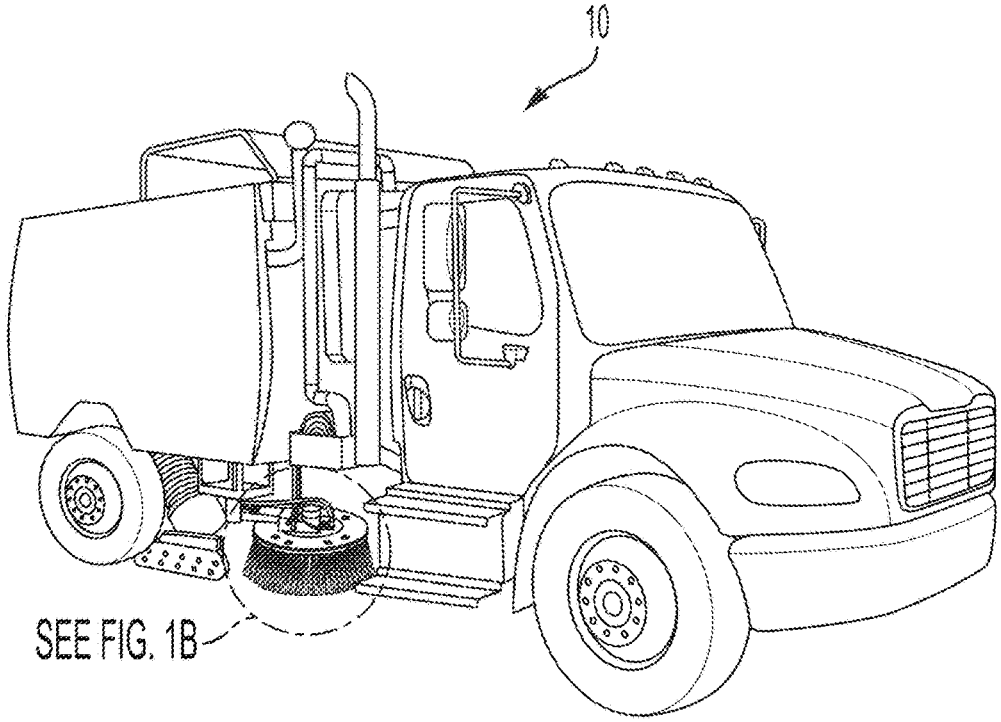
FIG. 1A is a perspective view of a vehicle with a gutter broom according to various aspects.

The features and advantages of the aspects will become more apparent from the detail description set forth below when taken in conjunction with the drawings, in which like reference characters identify corresponding elements throughout. In the drawings like reference numbers generally indicate identical, functionally similar, and/or structurally similar elements.

DETAILED DESCRIPTION

The present invention(s) will now be described in detail with reference to aspects thereof as illustrated in the accompanying drawings. References to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The following examples are illustrative, but not limiting, of the present aspects. Other suitable modifications and adaptations of the variety of conditions and parameters normally encountered in the field, and which would be apparent to those skilled in the art, are within the spirit and scope of the disclosure.

Aspects provide a gutter broom. As described herein, the gutter broom can be segmented and can include one or more block segments (e.g., one block segment to four or five block segments). Each block segment can have one or more openings (e.g., approximately 20 openings to approximately 40 openings) arranged in one or more rows (e.g., two rows). Each opening can receive bristles that can form a U-shape around a wall in the opening and extend downward to contact a surface to be cleaned. As the gutter broom rotates around its central axis (i.e., its axis of rotation), the bristles can clean a surface along the path of the gutter broom.

Surfaces can be made of different materials and/or amass debris, requiring varied cleaning applications. The gutter broom described herein can include patterns to adapt to a variety of surfaces. The pattern can, in part, be defined by the quantity of block segments. Each block segment can have the same or different array of openings to receive bristles for cleaning, structure of openings, and/or positioning of bristles. This, together, can form a pattern to modularly adapt a gutter broom for cleaning one or more specific surfaces.

Cleaning can target different surfaces and break down and/or remove debris. Bristles can vary in stiffness to adapt cleaning to different surfaces. For example, bristles can have a first stiffness or a second stiffness, where the second stiffness is different than the first stiffness. Bristles having the second stiffness can be stiffer to provide more aggressive cleaning than the first bristles. The quantity and/or positions of bristles having the different stiffness can be varied across gutter brooms and gutter broom blocks to further adapt cleaning. For example, on paved roads, bristles having the stiffer second stiffness can be limited to prevent damage to roads from abrasive contact, i.e., highly aggressive cleaning. In another example, bristles having the second stiffness can be positioned radially outward of bristles having the first stiffness to target surfaces having growth (e.g., weed or grass patches), such as gutter surfaces or surfaces adjacent to curbs and buildings, which are susceptible to substantial growth. Further, positioning bristles having the second stiffness in certain positions can prevent them from splaying while rotating and can thus increase their cleaning effectiveness. Bristles having different stiffness can reinforce each other and function together (e.g., as a composite) to leverage the varied stiffness and provide more efficient cleaning.

The gutter broom described herein can additionally be efficiently manufactured because each component can be discretely produced and distributed. Further, including bristles of varying stiffness can reduce the weight of the gutter broom, which can support manufacturing efficiency.

Increased manufacturing efficiency can significantly reduce the cost of the gutter broom. Cost savings can additionally progress beyond manufacturing; e.g., the lower weight of the gutter broom can support extended motor life and limited operating costs. Accordingly, bristle stiffness selection and placement in the gutter broom block can be a function of surface type to both effectively clean and prevent damage from continuous abrasive contact, along with operating device motor considerations.

Figure 1B:
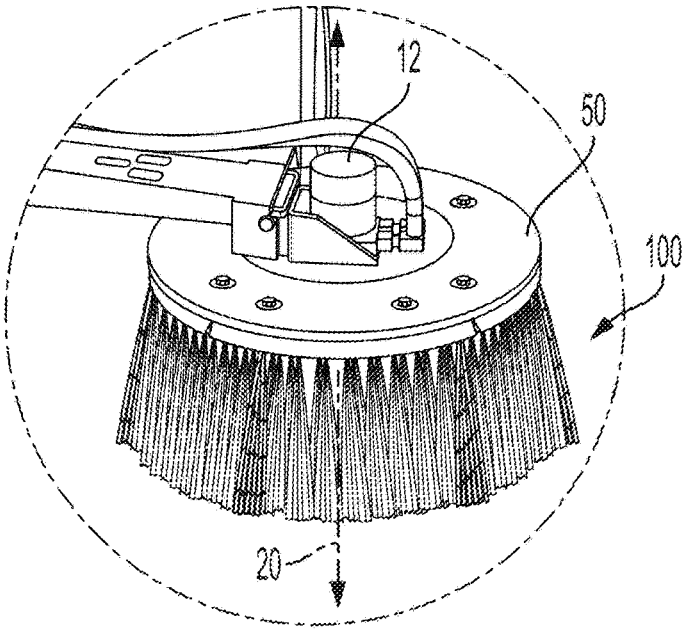
FIG. 1B is an enlarged view of the gutter broom in FIG. 1A according to various aspects.

A gutter broom 100 is shown in FIGS. 1A-B. In some aspects, gutter broom 100 can be mounted onto a vehicle 10 (e.g., a truck, tractor, or compact vehicle). Vehicle 10 can guide gutter broom 100 along a variety of surfaces. Gutter broom 100 can be positioned at a side of vehicle 10 to move along curbs or the sides of buildings for cleaning (e.g., sweeping, debris and/or particulate matter removal, etc.) where debris can collect. Vehicle 10 can also move gutter broom 100 along floors in, for example, manufacturing areas or retail environments. Vehicle 10 can support a driver 12 and a drive plate 50. Driver 12 can rotate drive plate 50 and gutter broom 100 supported by drive plate 50 (e.g., via an electric or a hydraulic motor). Gutter broom 100 can rotate about its central axis 20 (i.e., its axis of rotation) to move and/or break down debris or other matter along its path (e.g., weeds, grass, mud, dirt, sand, trash, etc.). Central axis 20 can be generally perpendicular to the path along which gutter broom 100 moves (e.g., surfaces to be cleaned). In an aspect, central axis 20 can be generally vertical. Gutter broom 100 can be positioned to be generally horizontal as it rotates about the generally vertical central axis 20. In an aspect, central axis 20 can be generally vertical. Gutter broom 100 can be positioned to be generally horizontal as it rotates about the generally vertical central axis 20.

Figure 2:
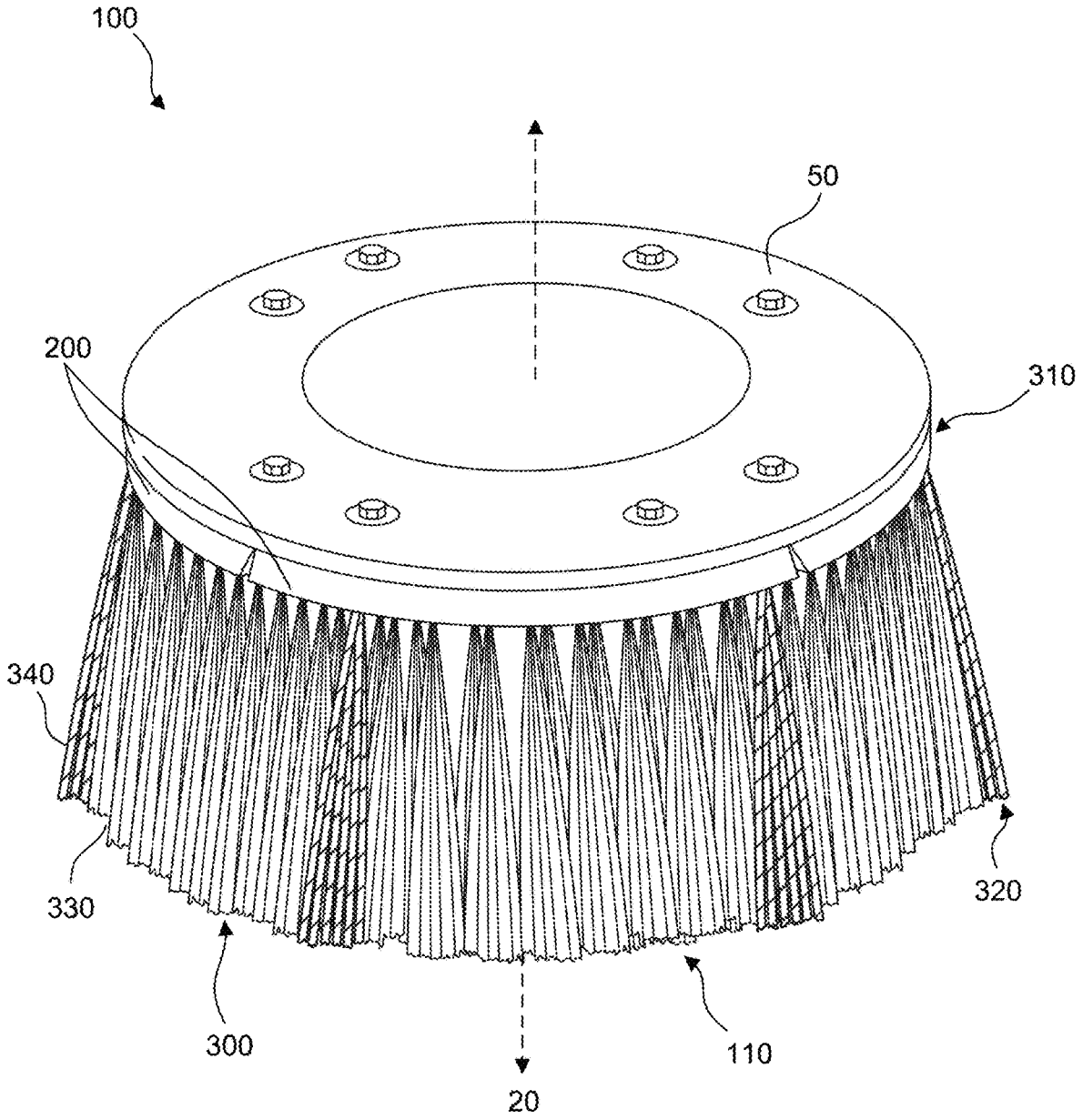
FIG. 2 is a perspective view of a gutter broom according to various aspects.
Figure 3:
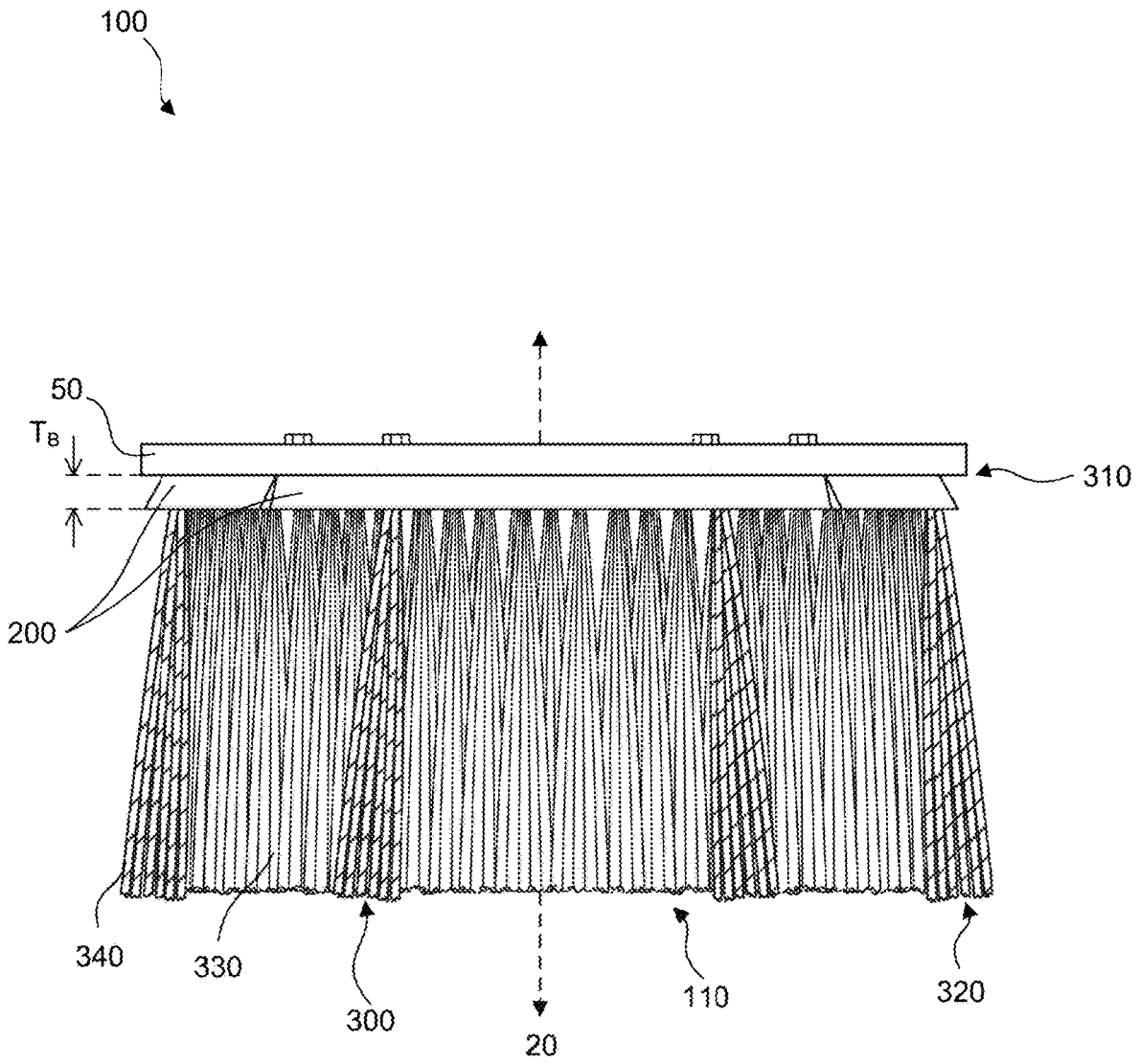
FIG. 3 is a side view of a gutter broom according to various aspects.

As shown in FIGS. 2-3 (see also FIGS. 11A-16), gutter broom 100 can be segmented such that it can include one or more block segments 200. In some aspects, gutter broom 100 can include approximately one to approximately five block segments 200. Gutter broom 100 can also include bristles 300. In an aspect, bristles 300 can include first bristles 330 and/or second bristles 340. In some aspects, debris or other matter along the path of gutter broom 100 can be directed upward through an opening 110 for collection (e.g., via air suction).

Block segments 200 can be secured to drive plate 50. In some aspects, a fixed attachment between block segments 200 and drive plate 50 can utilize bolts, adhesive, welding, etc. Block segments 200 can be secured to drive plate 50 such that they are radially arranged around central axis 20 of gutter broom 100. Further, block segments 200 can be arced and can have a thickness, $T_B$.

Bristles 300 can be positioned in and can extend down from block segments 200. Bristles 300 on gutter broom 100 can include an upper end 310 and a lower end 320. Upper end 310 can be supported by block segments 200, which will be described in further detail below. Lower end 320 can contact surfaces for cleaning.

In an aspect, gutter broom 100 can include first bristles 330 and/or second bristles 340. First bristles 330 can have a first stiffness. Second bristles 340 can have a second stiffness that is different than the first stiffness. Bristles 300 having different stiffnesses can permit gutter broom 100 to be adapted for a particular surface to be cleaned. For example, the quantity and/or positions of first bristles 330 and second bristles 340 on block segment 200 can be modified to adapt cleaning by gutter broom 100.

In an aspect, block segments 200 can be removably attached to drive plate 50. In an aspect, bristles 300 can be removably positioned in block segments 200. Accordingly, block segments 200 and bristles 300 can be modular such that gutter broom 100 can be adapted to a variety of surfaces after initial assembly and/or can be easily serviced. In another aspect, block segments 200 and bristles 300 can be integrally formed.

Figure 4:
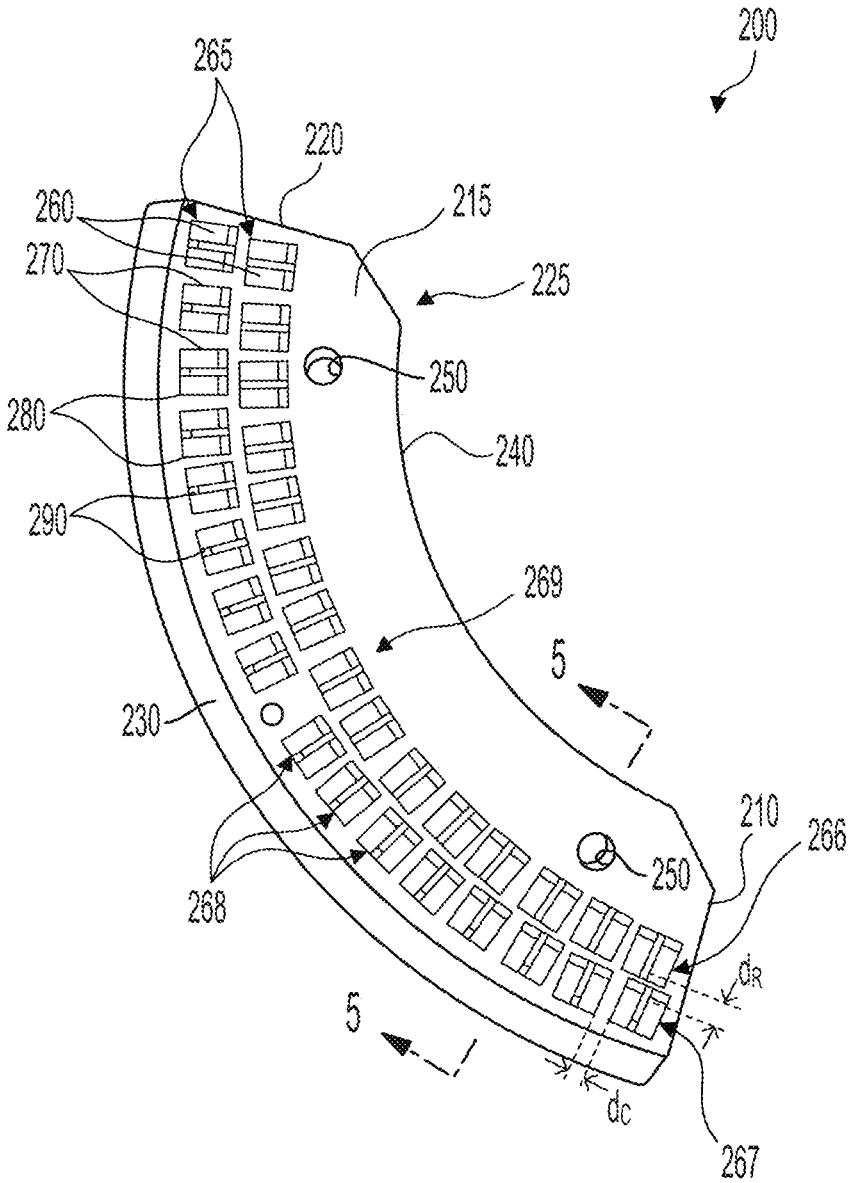
FIG. 4 is a top view of a block segment according to various aspects.

As shown in FIG. 4, block segment 200 can include a top surface 215, a bottom surface 225, a first end 210, a second end 220, an outer edge 230, and an inner edge 240. Top surface 215 and bottom surface 225 can be opposing top and bottom sides of block segments 200. First end 210 and second end 220 can be opposing transversely extending sides of block segments 200. Outer edge 230 and inner edge 240 can be curved and can be opposing longitudinally extending sides of block segments 200. Inner edge 240 can be radially inward of outer edge 230 such that it can face the interior of gutter broom 100.

In some aspects, outer edge 230 can be ramped or beveled such that outer edge 230 is oblique in relation to top surface 215 and/or bottom surface 225. The distance from central axis 20 where outer edge 230 meets bottom surface 225 can be greater than the distance from central axis where outer edge 230 meets top surface 215. Accordingly, bottom surface 225 can extend farther from central axis 20 than top surface 215. In some aspects, block segments 200 do not extend beyond drive plate 50. In other aspects, outer edge 230 of a block segment 200 can extend beyond drive plate 50. Accordingly, gutter broom 100 can be positioned to absorb lateral impact (e.g., from curbs, the sides of buildings, walls, rims, etc.).

Block segment 200 can additionally include one or more mounting alignment holes 250. Block segment 200 can include one or more openings 260 arranged in one or more rows 265 and columns 268. Each opening 260 can include a first sidewall 270, a second sidewall 280, and a wall 290. In an aspect, openings 260 have approximately the same size and dimension, and the same wall 290.

Figure 5:
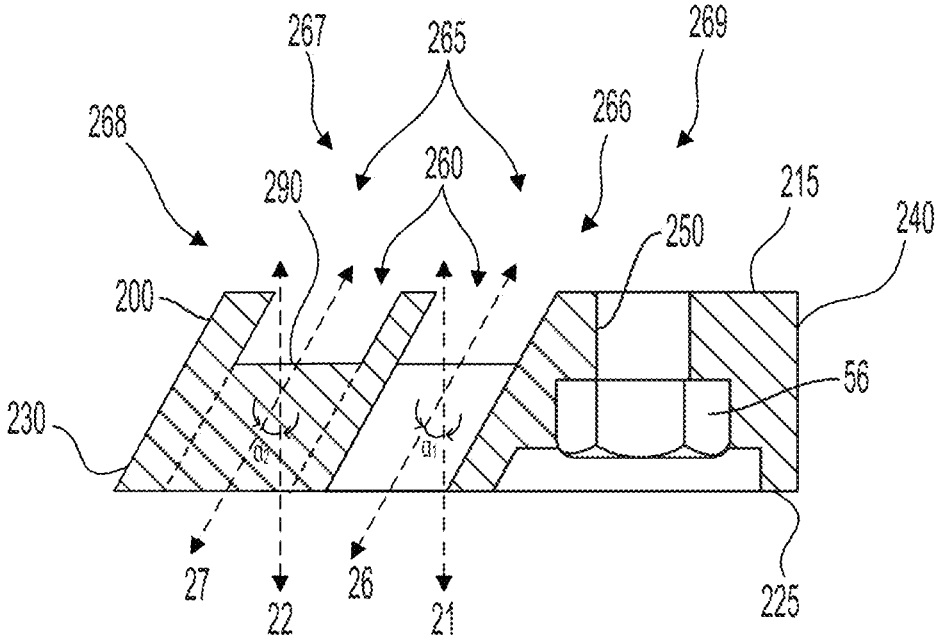
FIG. 5 is a cross-sectional view of the block segment in FIG. 4 along line 5-5 according to various aspects.

Openings 260 can receive and support bristles 300, including first bristles 330 and/or second bristles 340. As shown in FIG. 5, openings 260 can extend through the thickness of block segments 200 from top surface 215 to bottom surface 225 (thickness, $T_B$, shown in FIG. 3). Wall 290 can extend transversely through opening 260. Bristles 300 can be U-shaped and can be inverted and inserted into openings 260. Bristles 300 can surround wall 290 such that each side (i.e., leg of U-shape) of bristles 300 can positioned on opposite sides of wall 290. Bristles 300 can be retained in openings 260 by fitting between first sidewall 270 and second sidewall 280. In some aspects, bristles 300 can be retained by alternative or additional attachments, e.g., adhesive, welding, etc. In an aspect, the fitting can allow some movement of bristles 300. In this way, bristles 300 can flex and adjust during rotation of gutter broom 100. Bristles 300 can extend through openings 260 and outwardly from bottom surface 225 of block segment 200. Further details on bristles 300 are provided below. In some aspects, openings 260 can be circular from a top view, however, other orientations of openings 260 are contemplated (e.g., rectangular, elliptical, etc.).

With reference to FIGS. 4-5, in some aspects, openings 260 can be arranged in two rows 265, a first row 266 and a second row 267. In other aspects, openings 260 can be arranged in three or more rows 265. In an aspect, rows 265 can be radial rows. First row 266 can be adjacent to inner edge 240. Second row 267 can be adjacent to outer edge 230 such that it is intermediate to first row 266. In this way, second row 267 can be the outer row and first row 266 can be the inner row. In some aspects, block segments 200 can taper from outer edge 230 to inner edge 240. Accordingly, first row 266 can support fewer openings 260 than second row 267. In other aspects, first row 266 can support more openings 260 than second row 267. In some aspects, first row 266 and second row 267 can have the same number of openings 260. In these aspects, openings 260 arranged on first row 266 can be closer together than openings 260 arranged on second row 267.

Openings 260 in first row 266 can have a central axis 26 (i.e., an axis within the interior of opening 260). Openings 260 in second row 267 can have a central axis 27 (i.e., an axis within the interior of opening 260). In some aspects, openings 260 in first row 266 and openings 260 in second row 267 can be generally adjacent. In an aspect, these openings 260 can form column 268. Accordingly, openings 260 arranged in rows 265 can also be arranged in one or more columns 268. In an aspect, column 268 can be a radial column. In an aspect, only one opening 260 can be arranged in column 268. In this aspect, first row 266 and second row 267 can have a different number of openings 260. In some aspects, openings 260 can be arranged adjacently in the same row 265 at a distance, $d_C$. In some aspects, openings 260 can be arranged adjacently in different rows 265 at a distance, $d_R$. For example, $d_C$ and/or $d_R$ can range from approximately 1 cm to approximately 20 cm, such as 5 cm to 15 cm.

In some aspects, rows 265 and columns 268 can form an array 269. In some aspects, array 269 and the quantity and/or positions in block segment 200 of first bristles 330 and second bristles 340 can together form one or more patterns. As discussed above, the quantity and/or positions in block segments 200 of first bristles 330 and second bristles 340 can adapt cleaning by gutter broom 100 to a variety of surfaces. Each pattern can adapt gutter broom 100 to clean one or more specific surfaces. In some aspects, openings 260 can extend through the thickness of block segments (thickness, $T_B$, shown in FIG. 3) from top surface 215 to bottom surface 225 segment at one or more angles. The angle(s) at which openings 260 extend can additionally define patterns.

Openings 260 can extend through the thickness of block segments (thickness, $T_B$, shown in FIG. 3) from top surface 215 to bottom surface 225 segment at an angle up to approximately 60 degrees from an axis generally parallel to central axis 20 of gutter broom 100. As shown in FIG. 5, in some aspects, openings 260 arranged in first row 266 can extend at an angle, $\alpha_1$, from an axis 21. For example, $\alpha_1$ can range from approximately 0 degrees to approximately 60 degrees, such as approximately 10 degrees to approximately 30 degrees. Similarly, openings 260 arranged in second row 267 can extend at an angle, $\alpha_2$, from an axis 22. For example, $\alpha_2$ can range from approximately 0 degrees to approximately 60 degrees, such as approximately 10 degrees to approximately 30 degrees.

In some aspects, openings 260 across first row 266 and second row 267 can extend at the same angle from axis 21 and axis 22, respectively. Accordingly, angle, $\alpha_1$, from axis 21 and angle, $\alpha_2$, from axis 22 can be approximately equal. In this way, openings 260 in array 269 can be similarly angled with respect to vertical. In other aspects, openings 260 across first row 266 and second row 267 can extend at different angles from axis 21 and axis 22, respectively. In this way, openings 260 arranged in first row 266 can extend at angle, $\alpha_1$, from axis 21, and openings 260 arranged in second row 267 can extend at angle, $\alpha_2$, from an axis 22. Alternatively, openings 260 arranged in the same row 266/267, respectively, can extend at different angles from an axis generally parallel to central axis 20 of gutter broom 100. For example, across first row 266, one or more openings 260 can extend at an angle, $\alpha_1$, from axis 21. Similarly, across second row 267, one or more openings 260 can extend at an angle, $\alpha_2$, from an axis 22.

Figure 6:
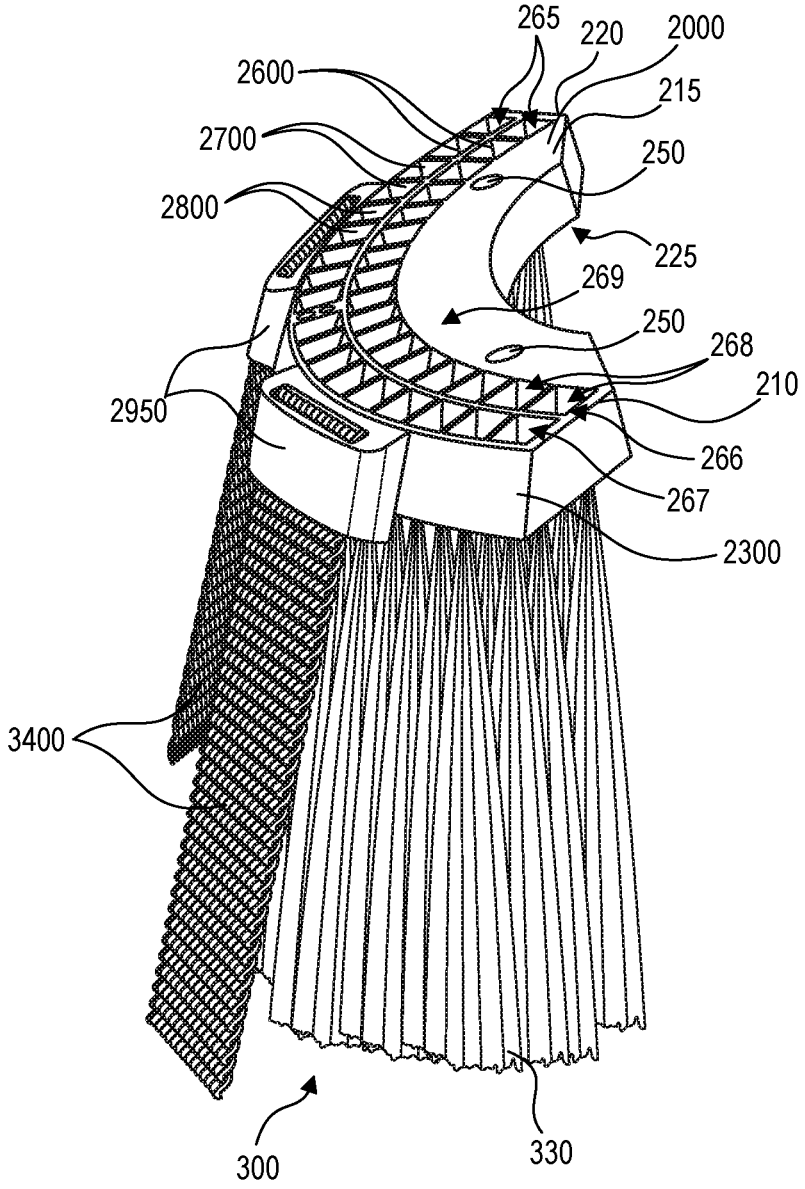
FIG. 6 is a perspective view of a block segment according to various aspects.

With reference to FIGS. 5-6, bristles 300 can extend through openings 260 and outward from bottom surface 225 of block segment 200. Across first row 266, bristles 300 can extend outward from bottom surface 225 of block segments 200 substantially along central axis 26 at an angle, $\alpha_1$, from an axis 21. Across second row 267, bristles 300 can extend outward from bottom surface 225 of block segments 200 substantially along central axis 27 at an angle, $\alpha_2$, from an axis 22. In some aspects, bristles 300 extending at angle, $\alpha_1$, from axis 21 or angle, $\alpha_2$, from axis 22 can be offset from and/or generally parallel to adjacent bristles 300 (e.g., in the same row 265 or different row 265). Offsetting bristles 300 can lessen contact between generally adjacent bristles 300 as gutter broom 100 rotates around central axis 20. In an aspect, this can allow for longer bristles 300. In some aspects, first bristles 330 having a first stiffness and second bristles 340 having a second stiffness can be positioned in openings 260 according to angle, $\alpha_1$, from axis 21 and angle, $\alpha_2$, from axis 22. In this way, the angle(s) at which first bristles 330 and second bristles 340 extend can additionally define patterns to adapt gutter broom 100 to clean one or more specific surfaces.

Figure 7B:
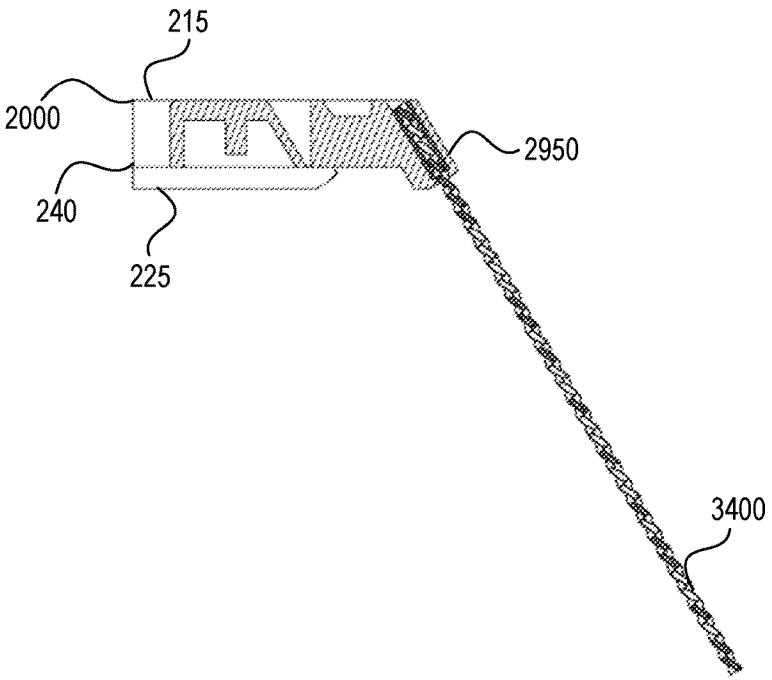
FIG. 7B is a side view of the block segment in FIG. 7A along line 7B-7B.

As shown in FIGS. 6-7B, in some aspects, a block segment 2000 can be similar to block segment 200 and can include and/or support similar components as block segment 200. In an aspect, block segment 2000 can additionally include a bristle receptacle 2950.

Figure 7A:
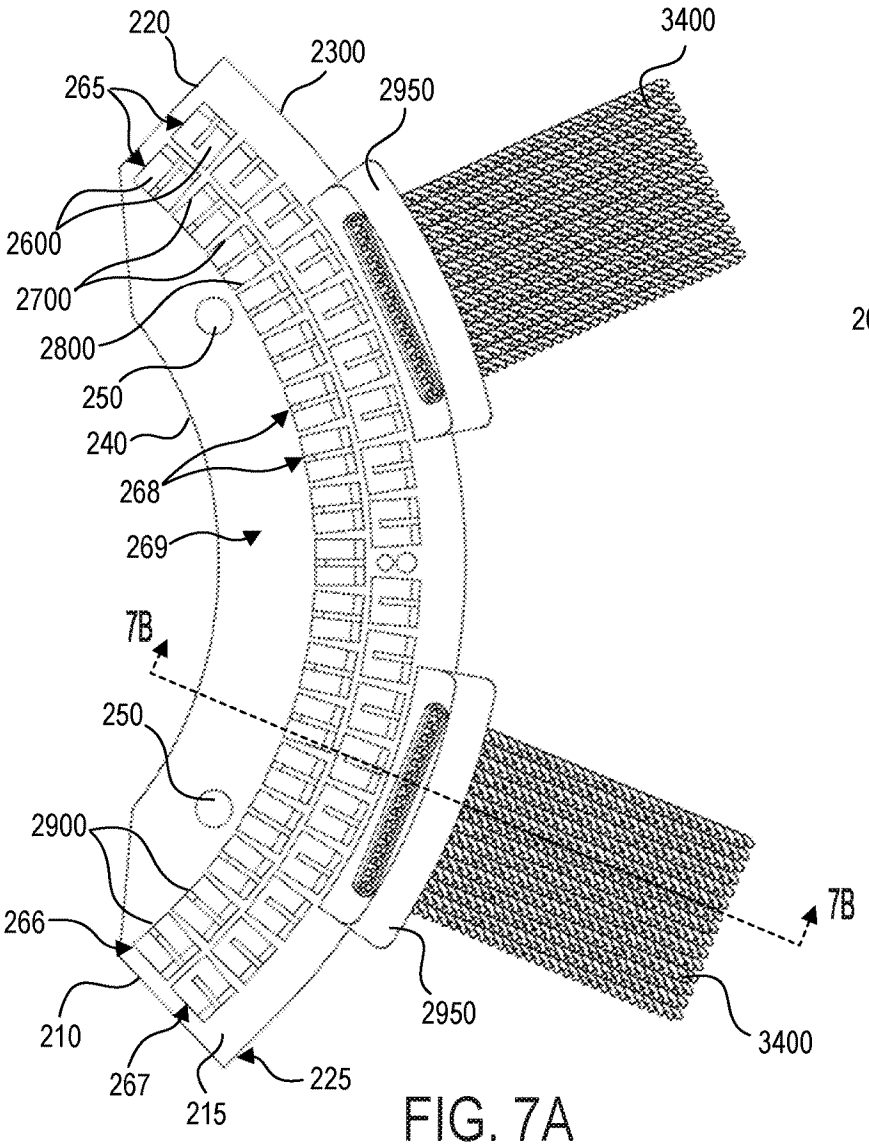
FIG. 7A is a top view of a block segment according to various aspects.

In an aspect, bristle receptacle 2950 can be integrally formed with block segment 2000. *For example, as shown in FIGS. 7A-7B, bristle receptacle 2950 can be formed with block segment 2950, such that bristle receptacle 2950 and block segment 2500 are unitary.* In another aspect, bristle receptacle 2950 can be attached to block segment 2000 utilizing bolts, adhesive, welding, etc. In an additional aspect, bristle receptacle 2950 can be removable such that it is modular and placement of it on block segment 2000 can be selected. In an aspect, bristle receptacle 2950 can be injection molded with block segment 2000. In some aspects, bristle receptacle 2950 can support bristles 3000. Bristles 3000 can be positioned in and can extend down from bristle receptacle 2950. Bristles 300 can be retained in bristle receptacle 2950 via a snap fit, press fit, or another attachment method (e.g., adhesive, bolts, welding, etc.). In an aspect, second bristles 3400 can be positioned in a cavity of bristle receptacle 2950. In another aspect, first bristles 3300 and/or second bristles 3400 can be positioned in bristle receptacle 2950. In some aspects, bristles 3000 retained by bristle receptacle 2950 can be angled similar to bristles 300 retained by block segment 2000. The addition and/or placement of bristle receptacle 2950 can additionally form patterns on the block segment 2000 to adapt cleaning for a particular application.

In another aspect, block segment 2000 can be modified to include bristle receptacle 2950 internal to outer edge 2300. In this aspect, bristle receptacle 2950 can be formed during an injection mold process, for example, by placing an insert in the tooling. The insert can include a cavity to form bristle receptacle 2950, which can receive the bristles.

With reference to FIGS. 5-7B, in some aspects, respective openings 260/2600, first sidewall 270/2700, second sidewall 280/2800, and/or wall 290/2900 can be dimensioned differently and/or be reinforced to retain second bristles 340/3400.

The increased size and/or strength can be sufficient to resist additional forces generated by the stiffer second bristles 340/3400.

With reference to FIGS. 8A-9B, bristles 300 can comprise one or more of metals, plastics, composites, ceramics, polymers, natural fibers, etc. For example, bristles 300 can comprise one or more of steel, aluminum, nylon, polyester, polypropylene, PVC, vegetable fibers, or hairs. In an aspect, bristles 300 can comprise flattened steel wire. In an aspect, bristles 300 placed within an opening 260 can include, for example, approximately fifteen to approximately thirty individual bristles. Other aspects provide that bristles 300 can be composed of other materials, or a blend of materials. For example, bristles 300 can have a steel and polypropylene mix. In another aspect, bristles 300 can comprise polyurethane or other composite material that is approximately 0.1 cm to approximately 0.21 cm in diameter. In some aspects, bristles 300 can be round and straight or crimped.

Including bristles 300 of different materials with different structural properties on a single block segment 200 can improve cleaning capability for a specific type of debris or surface. In another aspect, bristles 300 can vary in length, which can improve cleaning capability for a specific type of debris or surface, for example, an intermediate surface. In this aspect, the types of bristles 300 in a block segment 200 can be customized to improve cleaning capability for a specific type of debris or surface. Accordingly, material and profiles of bristles 300 can additionally define patterns to adapt gutter broom 100 to clean one or more specific surfaces. For example, gutter brooms generally can be used outdoors to clean streets that require different types or levels of contact (e.g., abrasive or fine). Streets can vary in granularity and can be made from various materials, e.g., concrete, brick, cobblestone, and/or asphalt, each requiring different cleaning methods. Streets can also include growth, such as patches of grass or weeds. In another example, streets can have other natural debris, such as sand, mud, and rocks, or non-natural debris, such as trash and recyclables. Accordingly, cleaning by gutter broom 100 can be enhanced to effectively clean these distinct surfaces, growth, and/or debris by modifying the bristles 300 and/or pattern of bristles 300 in block segment 200.

In an aspect, gutter broom 100 can include bristles 300 that can be first bristles 330 having a first stiffness and/or second bristles 340 having a second stiffness. First bristles 330 and second bristles 340 can be selectively placed on block segment 200 to define patterns to adapt gutter broom 100 to clean one or more specific surfaces. For example, second bristles 340 having a second stiffness greater than the first stiffness of first bristles 330 can provide a more abrasive contact on the surface being cleaned to better target debris, such as growth and compacted mud along streets. First bristles 330 having a first stiffness less than the second stiffness of second bristles 340 can provide a finer contact, for example, to remove sand and dust. Gutter broom 100 can include first bristles 330 and/or second bristles 340 to provide both abrasive and fine contact with surfaces.

In some aspects, first bristles 330 and second bristles 340 can be positioned in the same opening 260 in block segment 200. In an aspect, the stiffness of one or more portions of gutter broom 100 can be modified by increasing or decreasing the number of first bristles 330 or second bristles 340 in each opening 260.

In other aspects, respective openings 260 can include first bristles 330 or second bristles 340. In this aspect, the stiffness of one or more portions of gutter broom 100 can be modified by specifically positioning first bristles 330 and second bristles 340 in particular openings 260 on block segment 200. In an aspect, second bristles 340 can be positioned in openings 260 arranged in first row 266 and/or second row 267. In another aspect, second bristles 340 can be positioned in openings 260 only arranged in second row 267. Gutter broom 100 can also be customized by including fewer bristles 300. For example, bristles 300 can be omitted in openings 260 to create a paddle-type contact with surfaces, e.g., to clean around snow.

The position of first bristles 330 and second bristles 340 can be defined and/or modified based on the desired surface to be cleaned. For example, growth on surfaces can occur along curbs or the sides of building. Accordingly, stiffer bristles to target this debris, e.g., second bristles 340 having a second stiffness greater than the first stiffness of first bristles 330, can be positioned across second row 267.

Furthermore, the positions of first bristles 330 and/or second bristles 340 can additionally define patterns to adapt gutter broom 100 for a particular cleaning application. In an aspect, gutter broom 100 can include more first bristles 330 than second bristles 340 to limit abrasive contact and prevent damage to surfaces. In this way, the quantity of first bristles 330 and/or second bristles 340 can additionally define patterns.

Figure 8A:
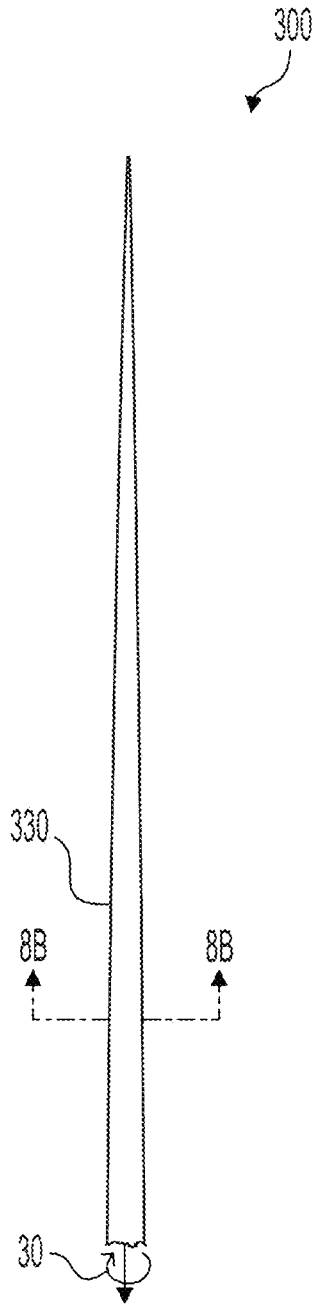
FIG. 8A is a side view of a bristle according to various aspects.
Figure 8B:
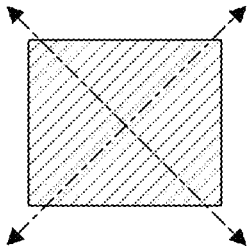
FIG. 8B is a cross-section view of the bristle in FIG. 8A along line 8B-8B.

First bristles 330 can have a first stiffness less than the second stiffness of second bristles 340. Stiffness can be determined by material, diameter, cross-sectional area, cross-section geometry, wall thickness, outer layers, coatings for reinforcement, ribbing, openings, etc. For example, first bristles 330 can have a cross-sectional geometry that is circular, elliptical, rectangular, or a star, plus sign, etc. As shown in FIGS. 8A-B, first bristles 330 can be made of steel, e.g., flattened spring steel. In other aspects, first bristles 330 can comprise other materials (e.g., metals, plastics, composites, ceramics, polymers, natural fibers, etc.). In an aspect, first bristles 330 can include material having a first modulus of elasticity that is less than a second modulus of elasticity of material of second bristles 340.

In other aspects, first bristles 330 and second bristles 340 can be the same material, but can have variable stiffness based on other properties such as diameter, cross-sectional area, cross-section geometry, wall thickness, outer layers, coatings for reinforcement, ribbing, openings, etc. In some aspects, the diameter of each first bristle 330 can be approximately 0.5 mm. In another aspect, the diameter of each first bristle 330 can be approximately 0.2 cm to approximately 0.4 cm wide, and approximately 0.05 cm to approximately 0.11 cm hardened spring steel. In another aspect, first bristles 330 can be compacted cable between approximately 0.3 cm and approximately 1.2 cm in diameter. In another aspect, first bristles 330 are flattened drawn wire having a rectangular cross section. The thickness can range from approximately 0.076 cm (0.03 in) to approximately 0.127 cm (0.05 in). The width can range from approximately 0.2 cm (0.08 in) to approximately 0.5 cm (0.2 in). In an aspect, first bristles 330 can have a first cross-section that has a first geometry. In an aspect, properties of first bristles 330 can have a lower moment of inertia with respect to the surface plane. Accordingly, first bristles 330 can be useful for finer cleaning to target separations between various surfaces. Greater movement and flexibility can be realized at impact such that first bristles 330 can buckle to reach crevices, granularity, gaps, etc. Additionally, first bristles 330 can better target lighter debris (e.g., sand and dust) and particulate matter.

Figure 9A:
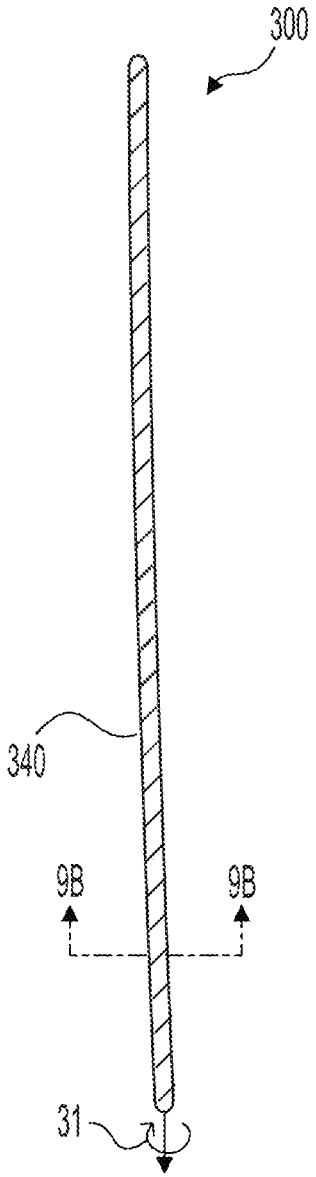
FIG. 9A is a side view of a bristle according to various aspects.
Figure 9B:
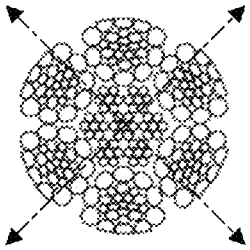
FIG. 9B is a cross-section view of the bristle in FIG. 9A along line 9B-9B.

As shown in FIGS. 9A-B, second bristles 340 can be made of steel, e.g., flattened spring steel. In other aspects, second bristles 340 can comprise other materials (e.g., metals, plastics, composites, ceramics, polymers, natural fibers, etc.). In an aspect, each second bristle 340 can have a diameter in a range from approximately 0.3 cm (0.125 in) to approximately 0.8 cm (5.16 in). In an aspect, second bristles 340 can be hardened spring steel and can have a diameter in a range from approximately 0.05 cm to approximately 0.11 cm. In another aspect, second bristle 340 can be compacted cable between and can have a diameter in a range from approximately 0.3 cm to approximately 1.2 cm. In some aspects, the diameter of each second bristle 340 can be approximately 0.476 cm (approximately 3/16 in). Second bristles 340 can be thicker than first bristles 330 such that second bristles 340 are stiffer. In other aspects, second bristles 340 can be folded over a composite "core" (i.e., a center mass) such that they are stiffer than first bristles 330.

In some aspects second bristles 340 can be a rod or flat shape comprising poly material. In some aspects, second bristles 340 can be coated in poly material. In these aspects, based on testing, gutter broom 100 enhances cleaning of growth (e.g., vegetation and/or dirt/mud cleaning). In these aspects, each second bristle 340 can have a diameter in a range from approximately 0.1 cm to approximately 3 cm, such as approximately 0.3 cm (0.125 in) to approximately 1.27 cm (0.5 in) or 1.9 cm (0.75 in).

In an aspect, second bristles 340 can have a second cross-section that has a second geometry. In some aspects, second bristles 340 can have a cross-sectional geometry that is circular, elliptical, rectangular, or a star, plus sign, etc. The cross-sectional geometry can provide the increased stiffness of second bristles 340. For example, in some aspects, second bristles 340 can have a ribbed exterior. Force from lateral impact can be transferred to openings between ribs. In this way, second bristles 340 can absorb impact and reduce flexing (i.e., second bristles 340 can be stiffer). In an aspect, second bristles 340 can have a higher moment of inertia with respect to the surface plane. Accordingly, the relatively stiffer second bristles 340 can be useful for more aggressive cleaning to target debris that can be tougher to move and/or break down (i.e., cut), such as growth, compacted mud, rocks, etc. The higher stiffness can reduce buckling and provide an inertial impact to move tougher debris. Second bristles 340 that are arranged together (e.g., grouped or adjacently) can grip and/or break down tougher debris more effectively.

As discussed above, bristles 300 can extend from block segments 200 at an angle from an axis generally parallel to central axis 20 of gutter broom 100. Angles, positions, stiffness, material, diameter, length, cross-section geometry, and combinations thereof of bristles 300 can create patterns to adapt gutter broom 100 to a variety of surfaces for cleaning. For example, gutter surfaces, which can be difficult to clean (e.g., because debris can be compacted from irregular cleaning and/or because the surface itself is difficult to reach), can be effectively cleaned by second bristles 340, which can be stiffer. Accordingly, in some aspects, second bristles 340 can be positioned radially outward of first bristles 330 to reach gutter surfaces. Angling second bristles 340 can further assist gutter broom 100 in targeting this debris. In other aspects, second bristles 340 can additionally or alternatively be positioned radially inward of first bristles 330 to target debris on the ground surface.

With reference to FIGS. 10A-15, as discussed above, gutter broom 100 can be segmented such that it can include one or more block segments 200. In some aspects, each block segment can have the same or different arrays 269, structure of openings 260, and/or positioning of bristles 300, including positioning of first bristles 330 and/or second bristles 340. This can additionally define patterns to adapt gutter broom 100 to a variety of surfaces for cleaning. Different gutter broom 100 patterns will now be described in detail.

Figure 10A:
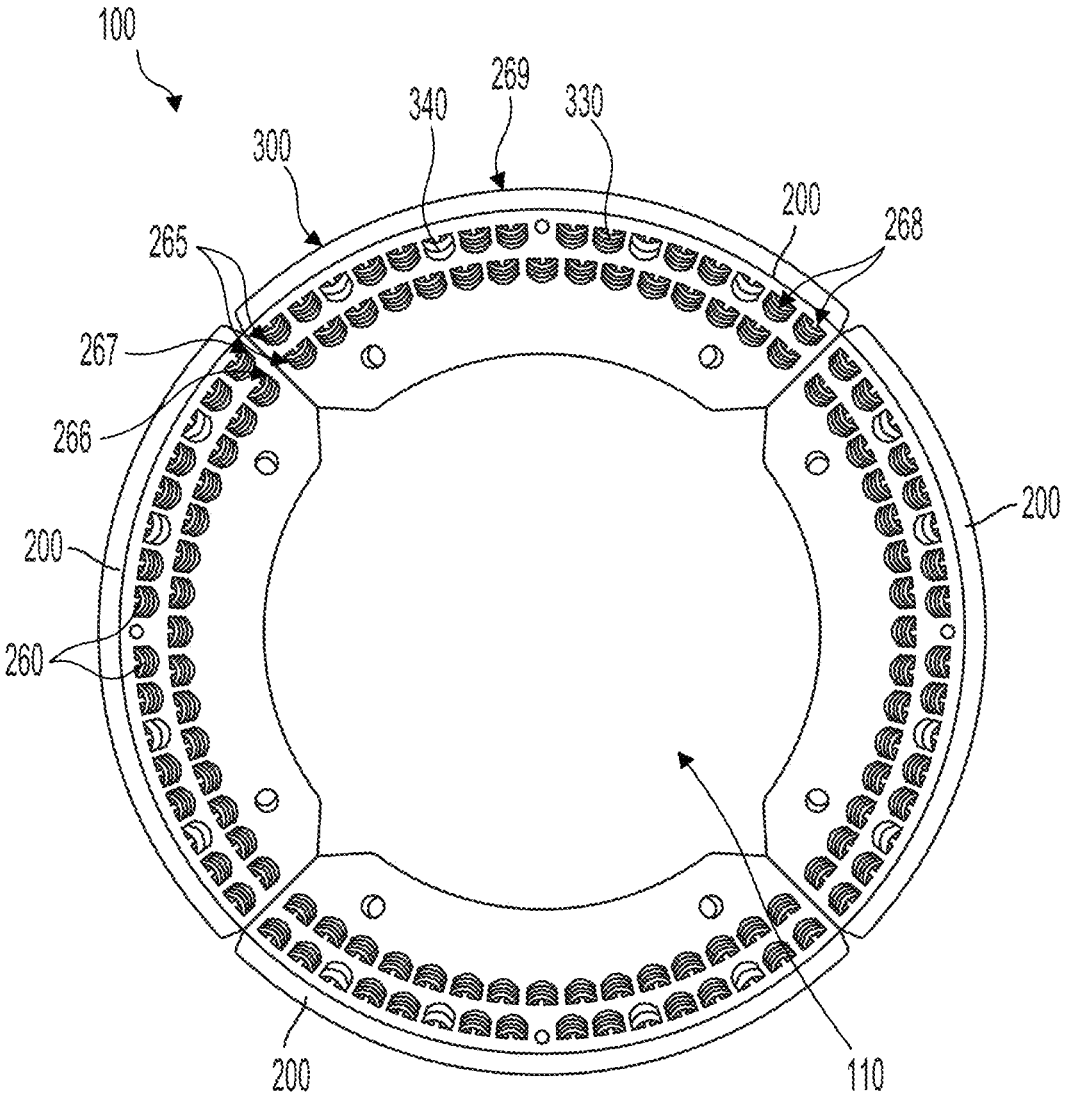
FIG. 10A is a top view of a gutter broom according to various aspects.
Figure 10B:
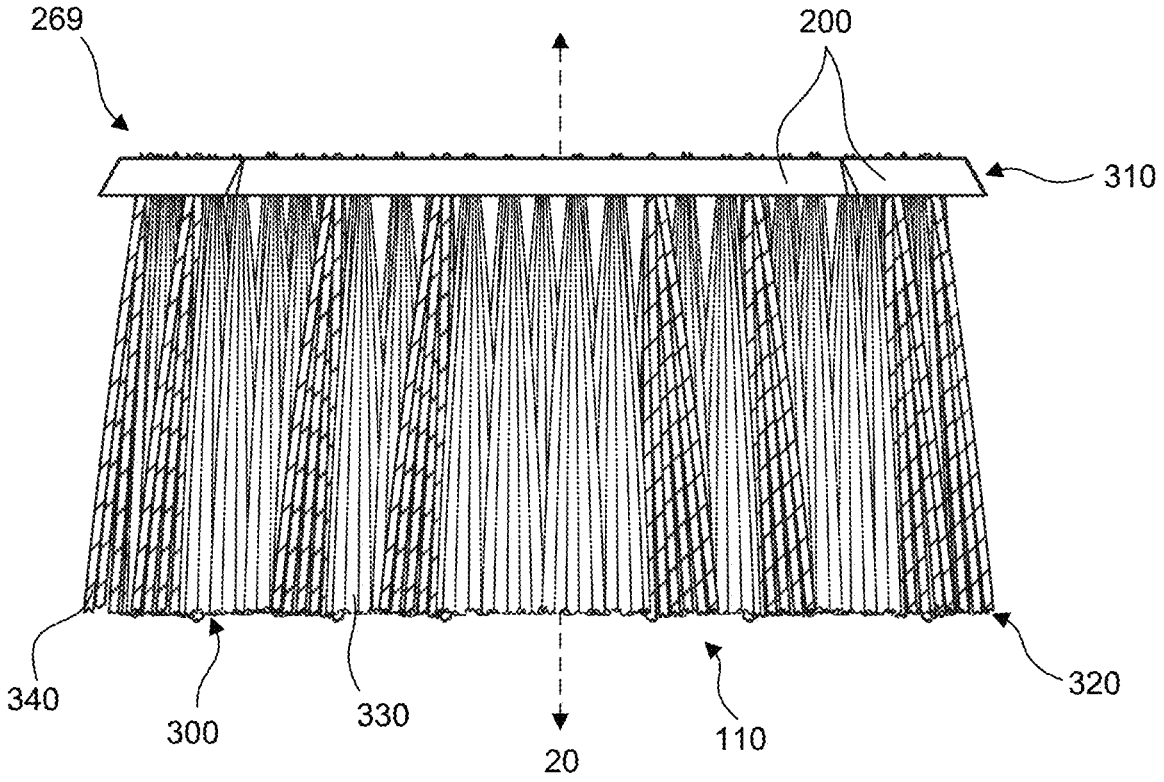
FIG. 10B is a side view of the gutter broom in FIG. 10A.

As shown in FIGS. 10A-B, in some aspects, each block segment 200 of gutter broom 100 can include openings 260 arranged in first row 266 and second row 267. In some aspects, block segment 200 can have approximately 31 openings 260. As discussed above, in some aspects, first row 266 can have more openings 260 than second row 267. Accordingly, first row 266 can have approximately 16 openings 260 and second row 267 can have approximately 15 openings 260. Each opening 260 in each first row 266 can receive and support bristles 300. In some aspects, both first bristles 330 having a first stiffness and second bristles 340 having a second stiffness greater than the first stiffness can be positioned in openings 260. In an aspect, second bristles 340 can be positioned in a number of openings 260 arranged in second row 267. In an aspect, approximately four second bristles 340 can be positioned in openings 260 arranged in second row 267. Accordingly, first bristles 330 can be positioned in the remaining openings 260 in second row 267 and/or first row 266. In this way, second bristles 340 can be radially outward of first bristles 330 in columns 268.

In an aspect, four of the openings 260 in second row 267 can include second bristles 340. In an aspect, the second bristles 340 can be alternately positioned in openings 260 in second row 267 such that they are only adjacent to first bristles 330 in second row 267. In an aspect, first bristles 330 and second bristles 340 positioned adjacently can move together as gutter broom 100 rotates around central axis 20. Adjacent first bristles 330 and second bristles 340 can reinforce each other and prevent splaying by distributing radial support. In this way, first bristles 330 and second bristles 340 can be retained in their general positions. In a further aspect, second bristles 340 can be positioned in openings 260 in second row 267 such that at least two openings 260 containing first bristles 330 are positioned between each opening 260 containing second bristles 340. In another aspect, each of the openings 260 in the first row 266 can contain first bristles 330. In a separate aspect, one or more of the openings 260 in the first row 266 can contain second bristles 340.

Figure 11A:
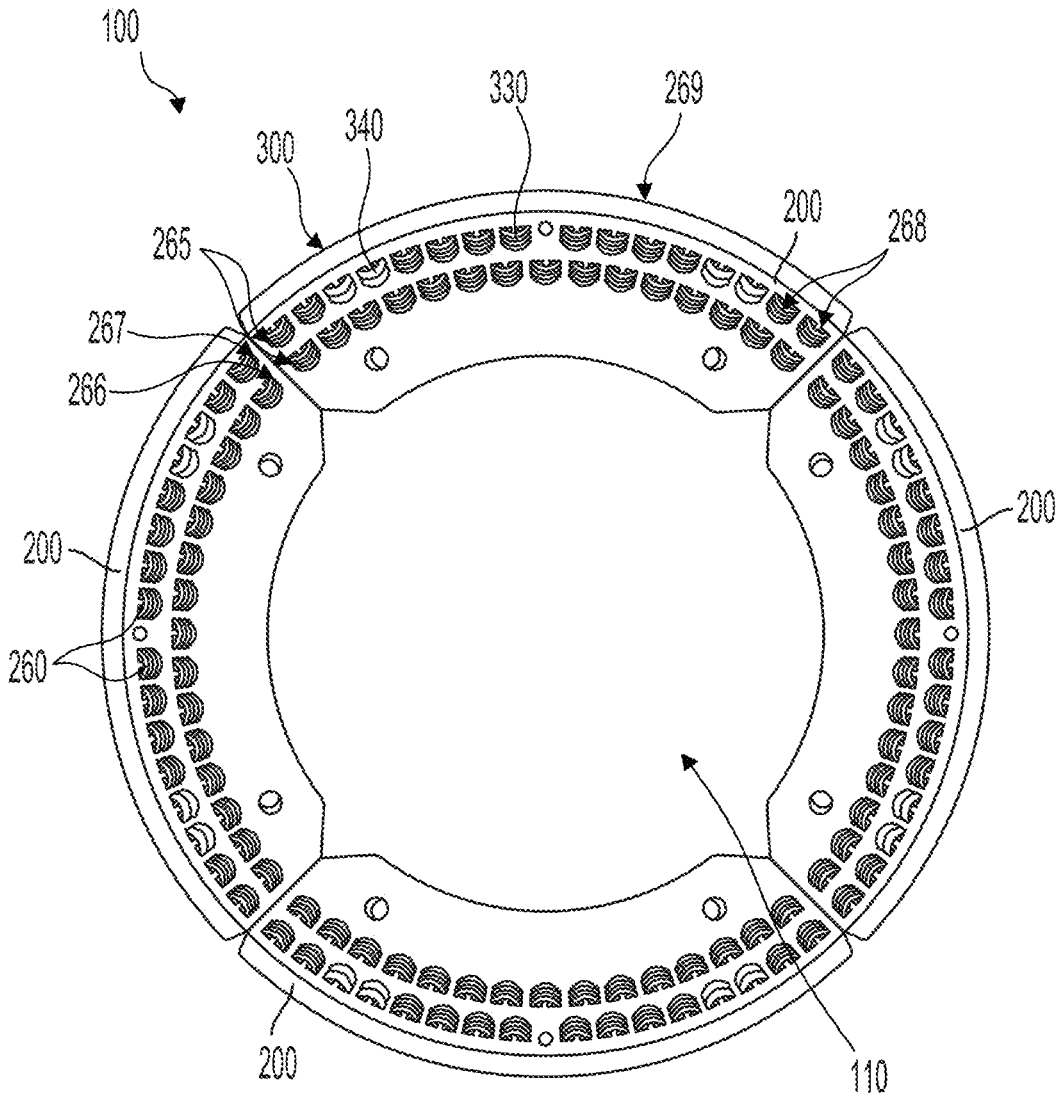
FIG. 11A is a top view of a gutter broom according to various aspects.
Figure 11B:
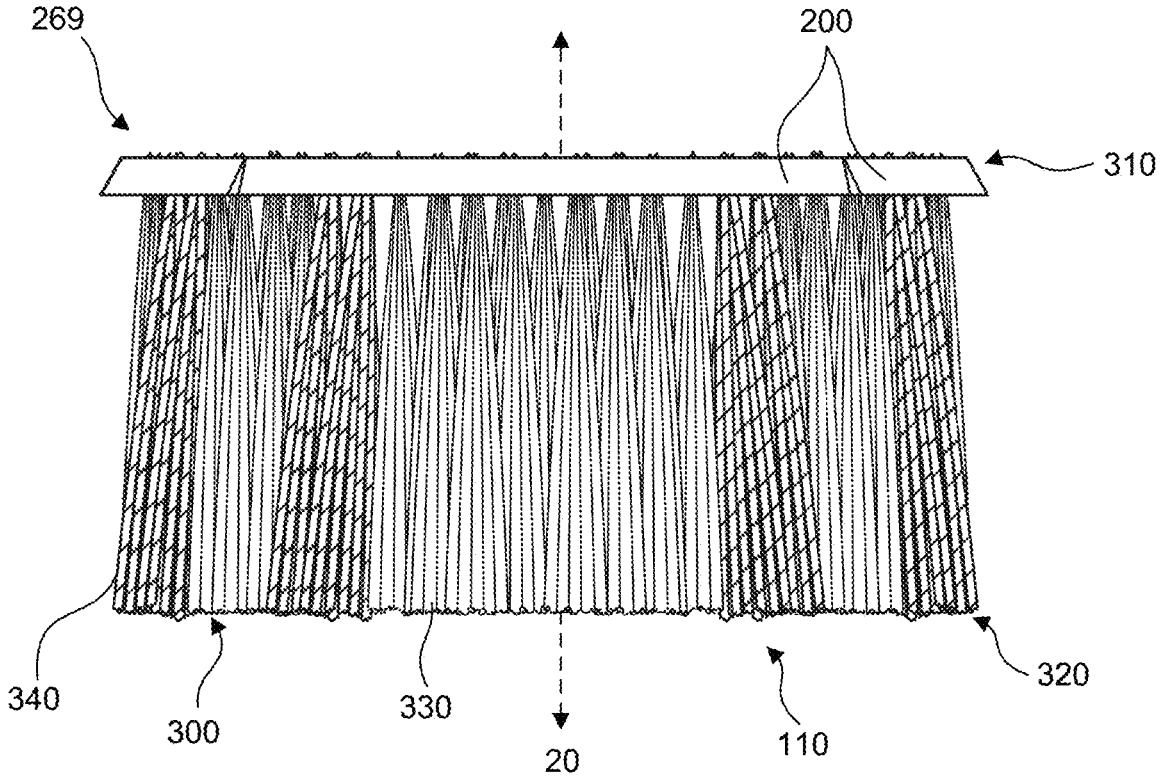
FIG. 11B is a side view of the gutter broom in FIG. 11A.

With reference to FIGS. 11A-B, in an aspect, four of the openings 260 in second row 267 can include second bristles 340. In an aspect, two consecutive openings 260 in second row 267 can include second bristles 340. Openings 260 positioned adjacent to the two consecutive openings 260 can include first bristles 330. In an aspect, second bristles 340 can be alternately and consecutively positioned in second row 267 such that each second opening 260 containing second bristles 340 is adjacent to only one other second bristles 340. Including two consecutive openings 260 in second row 267 with second bristles 340 can allow second bristles 340 to support each other to produce a more abrasive contact onto the cleaning surface. In another aspect, each of the openings 260 in the first row 266 can contain first bristles 330. In a separate aspect, one or more of the openings 260 in the first row 266 can contain second bristles 340.

Figure 12A:
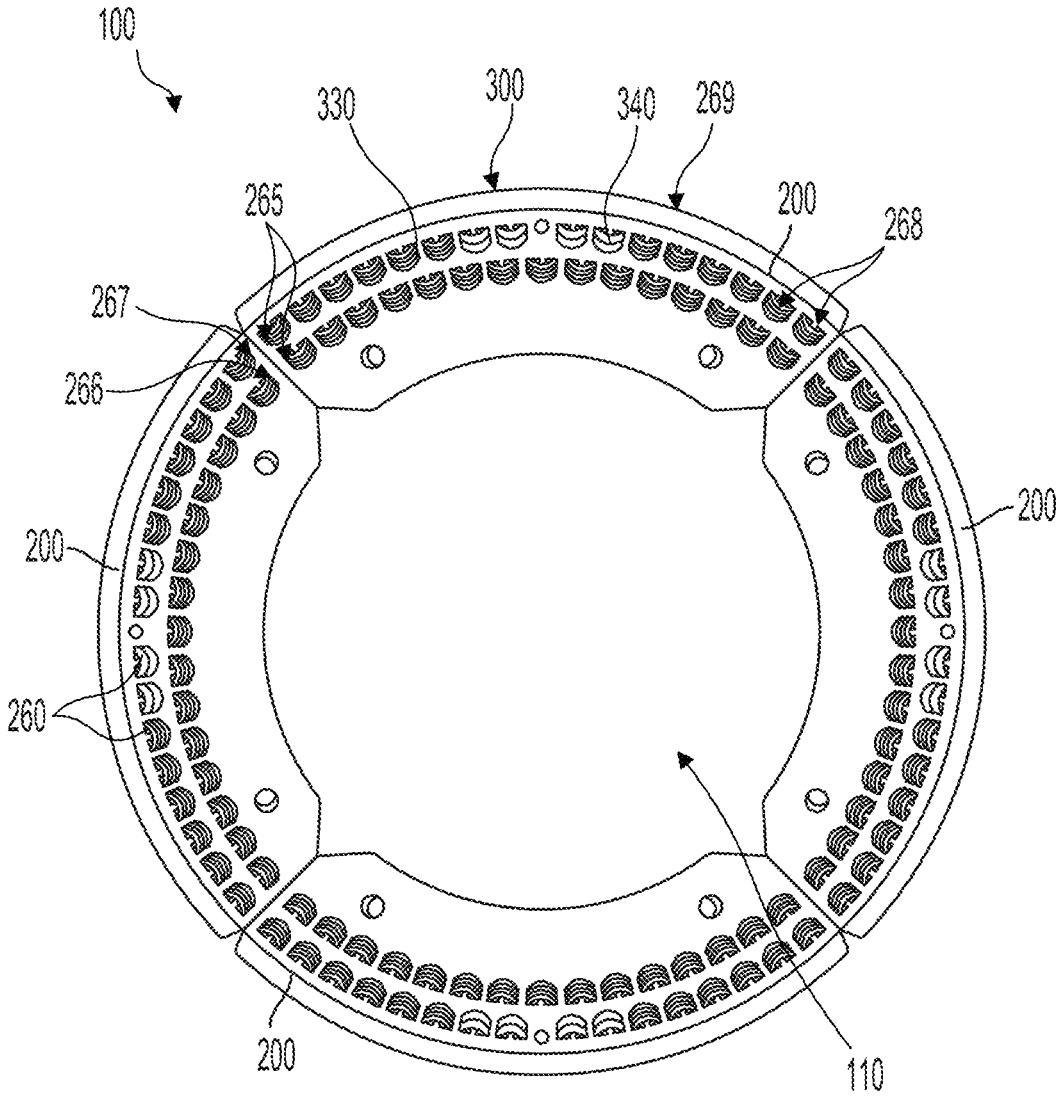
FIG. 12A is a top view of a gutter broom according to various aspects.
Figure 12B:
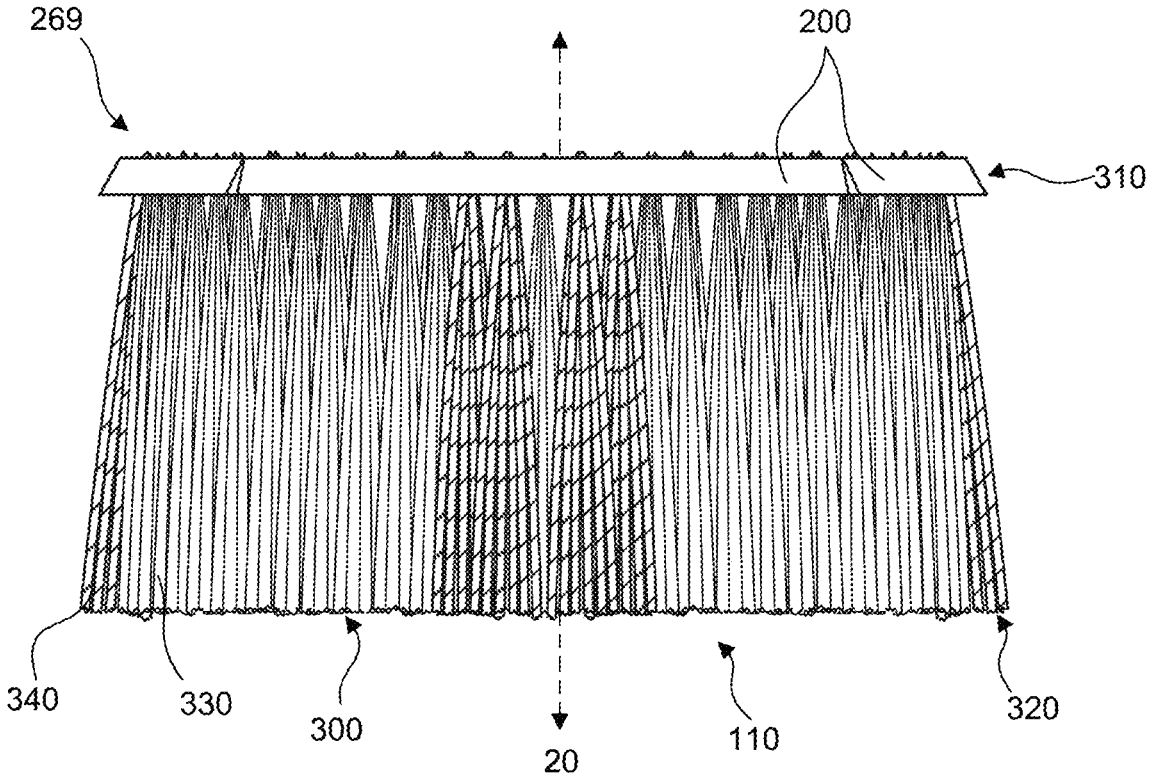
FIG. 12B is a side view of the gutter broom in FIG. 12A.

With reference to FIGS. 12A-B, in an aspect, four of the openings 260 in second row 267 can include second bristles 340. In an aspect, four or more openings 260 including second bristles 340 can be consecutively positioned in second row 267 such that all openings 260 containing second bristles 340 are adjacent to each other. In this way, adjacent second bristles 340 having a greater second stiffness can strengthen each other to produce a more abrasive contact. Additionally, adjacent first bristles 330 across, e.g., first row 266, can reinforce second bristles 340 and prevent splaying by distributing radial support. In another aspect, each of the openings 260 in the first row 266 can contain first bristles 330. In a separate aspect, one or more of the openings 260 in the first row 266 can contain second bristles 340.

Figure 13:
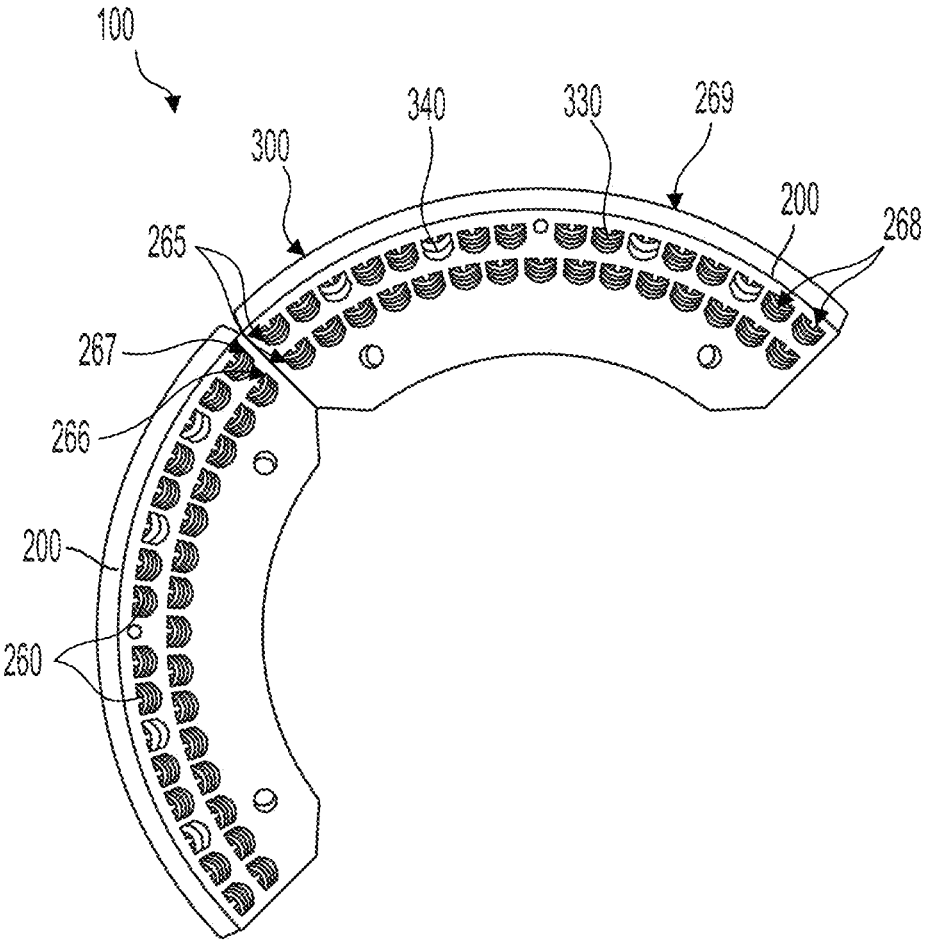
FIG. 13 is a top view of a gutter broom according to various aspects.

With reference to FIG. 13, in an aspect, gutter broom 100 can include multiple block segments 200. In some aspects, the multiple block segments 200 can have the same pattern of first bristles 330 and second bristles 340 in openings 260. In other aspects, gutter broom 100 can include multiple block segments 200 having different patterns of first bristles 330 and second bristles 340, e.g., any of the patterns in FIG. 10A, 11A, or 12A. Varying patterns of block segments 200 can vary contact with debris and surfaces as needed during the life of gutter broom 100.

Figure 14:
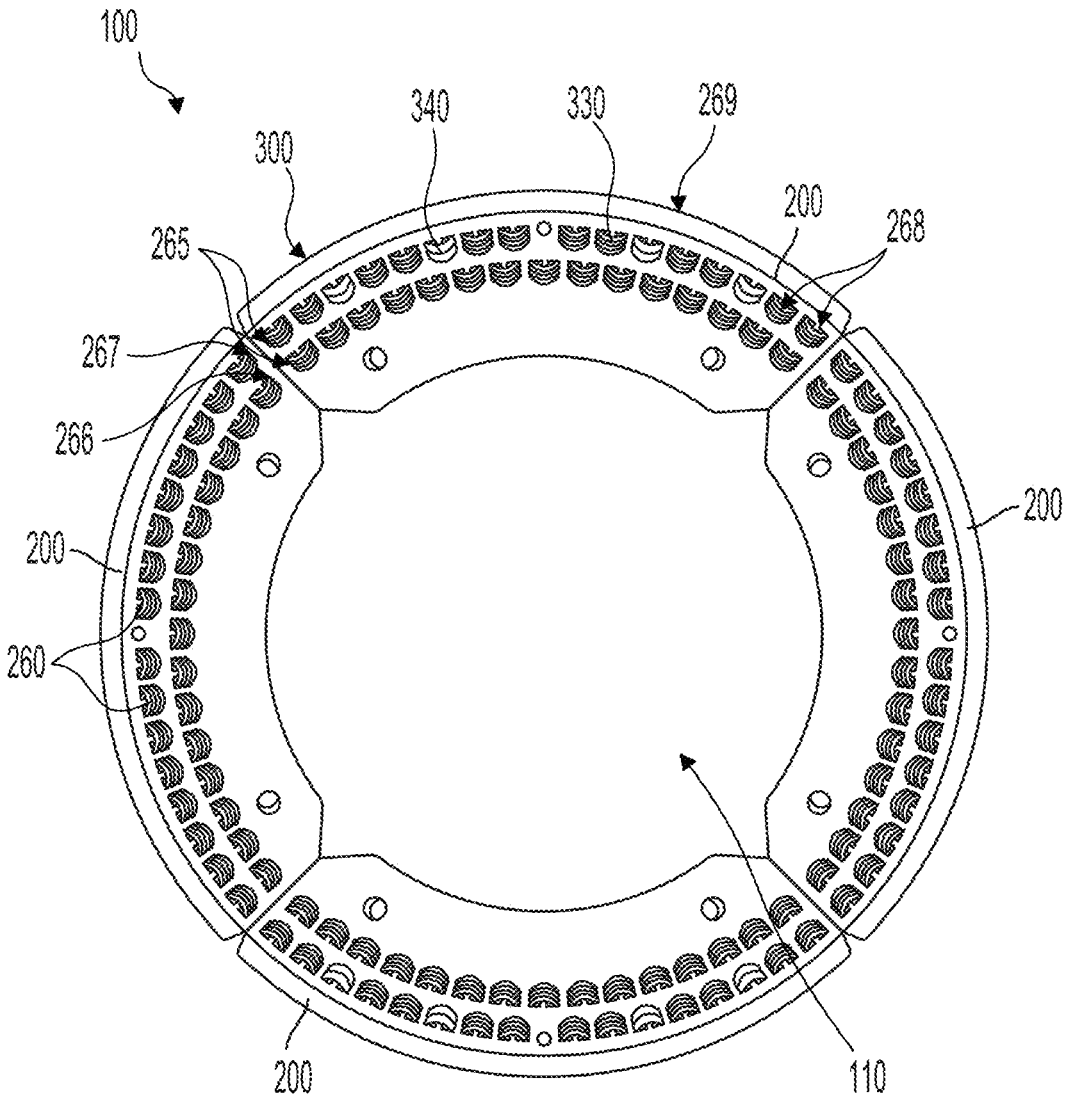
FIG. 14 is a top view of a gutter broom according to various aspects.
Figure 15:
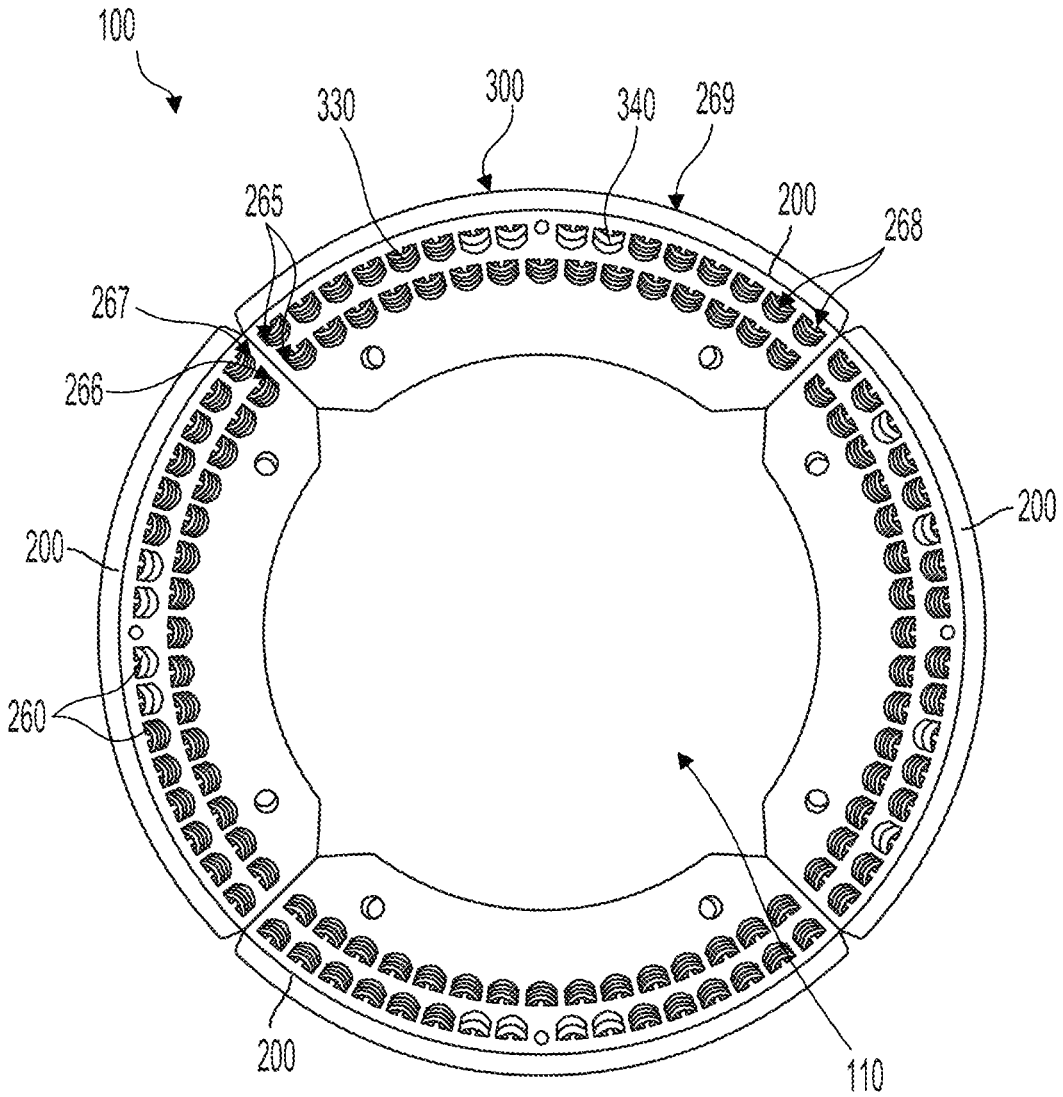
FIG. 15 is a top view of a gutter broom according to various aspects.

With reference to FIGS. 14-15, in an aspect, approximately one or more block segments 200 can have the same pattern of first bristles 330 and second bristles 340, and other block segments 200 can have a different pattern of first bristles 330 and second bristles 340. The other block segments 200 can have the same or different patterns of first bristles 330 and second bristles 340.

As shown in FIG. 14, gutter broom 100 can include first and second block segments 200 having openings 260 containing only first bristles 330, and third and fourth block segments 200 having openings 260 containing first bristles 330 and second bristles 340 according to the pattern shown in FIG. 10A.

As shown in FIG. 15, gutter broom 100 can include two or more block segments 200 having openings 260 containing first bristles 330 and second bristles 340 according to a same pattern, such as any of the patterns shown in FIG. 10A, 11A, or 12A, and another block segment 200 containing another a different pattern, such as another of the patterns shown in FIG. 10A, 11A, or 12A. In an aspect, gutter broom 100 can include two or more block segments 200 according to the pattern shown in FIG. 12A and another block segment 200 according to the pattern shown in FIG. 10A.

Figure 16:
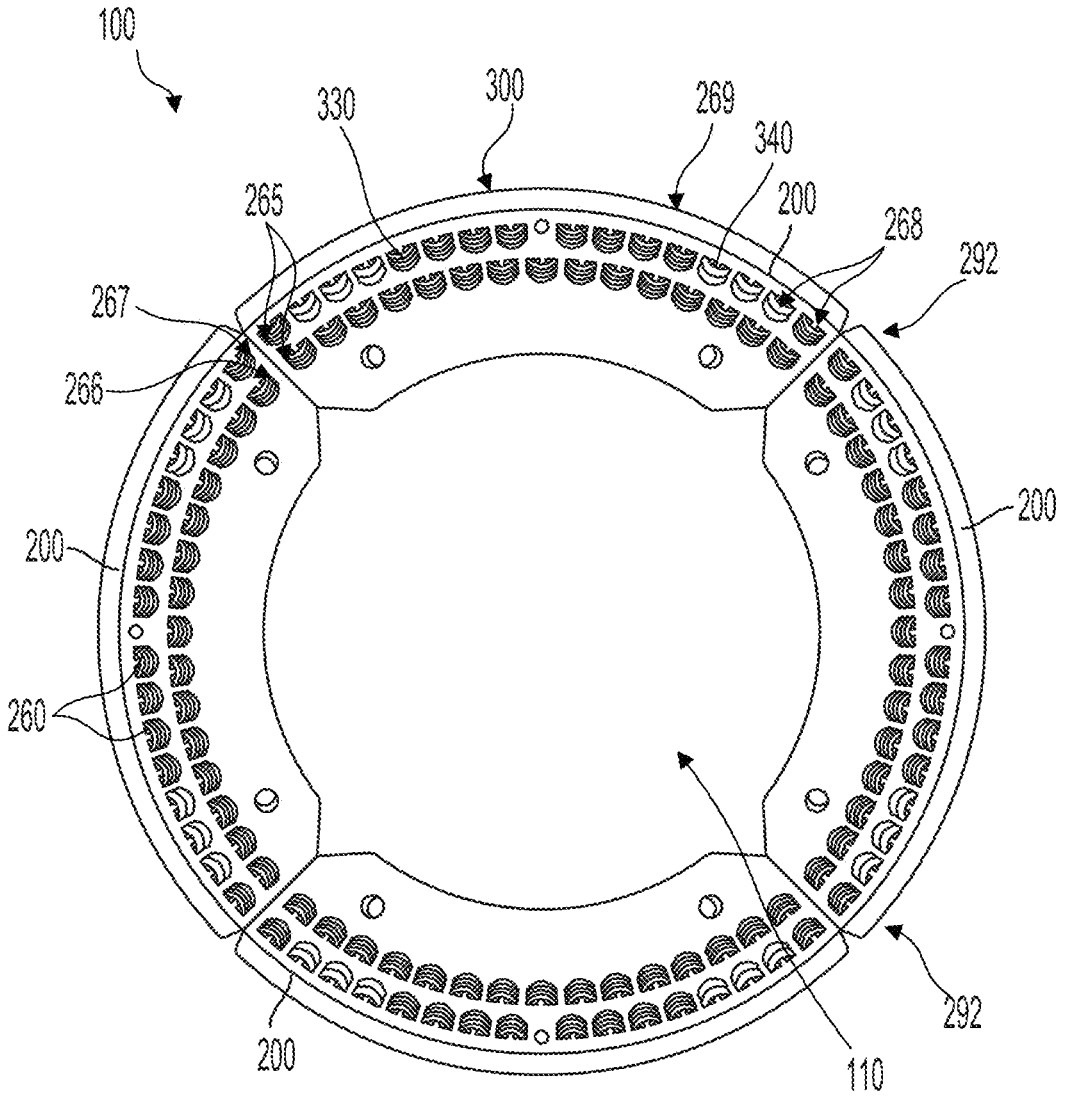
FIG. 16 is a top view of a gutter broom according to various aspects.

As shown in FIG. 16, gutter broom 100 can include one or more block segments 200 having openings 260 containing first bristles 330 and second bristles 340 according to a same pattern (e.g., approximately four to approximately five block segments 200). In this aspect, each block segment 200 can include two or more openings 260 (e.g., three openings) including second bristles 340 consecutively positioned in second row 267 such that all openings 260 containing second bristles 340 are adjacent to each other. In some aspects, the two or more openings 260 including second bristles 340 can be consecutively positioned in second row 267 such that they are collectively adjacent to one opening 260 including first bristles 330 on an outer end 292 of a block segment 200. In some aspects, each of the one or more block segments 200 can have multiple groupings of two or more openings 260 including second bristles 340 consecutively positioned in second row 267. In this aspect, each of the groupings of three or more openings 260 including second bristles 340 consecutively positioned in second row 267 can be collectively adjacent to one opening 260 including first bristles 330 on outer end 292 of a block segment 200. Accordingly, second row 267 can include one or more groupings of second bristles 340 consecutively positioned in second row 267. In some aspects, where block segment 200 can have approximately 31 openings 260 and each block segment 200 has two groupings of three openings 260 including second bristles 340 consecutively positioned in second row 267, each grouping can be separated by at least six openings 260 (e.g., eight openings 260) including second bristles 330.

In some aspects, block segment 200 can include 0.635 cm (0.25 in) super swaged cables. In some aspects, second bristles 340 can include approximately 15 super swaged cables to approximately 40 super swaged cables, such as approximately 24 super swaged cables. In some aspects, any of the patterns contemplated can include second bristles 340 having a length of approximately 50 mm to approximately 90 mm, such as approximately 65 mm to approximately 85 mm, such as approximately 65 mm to approximately 80 mm, such as approximately 66 mm (e.g., 26 in). In some aspects, second bristles 340 can be approximately 2 cm to approximately 3 cm longer than first bristles 330, such as approximately 2.54 cm (e.g., 1 in). In some aspects, second bristles 340 longer than first bristles 330 can improve performance in terms of cleaning efficiency at the beginning of life. For example, second bristles 340 can scrape a surface better (e.g., harder) while first bristles 330 remain less stiff and more flexible.

Based on testing, gutter broom 100, e.g., gutter broom 100 provided in FIG. 16, enhances cleaning of growth (e.g., vegetation and/or dirt/mud cleaning). Gutter broom 100 can also efficiently clean an area in one pass, 90% of the time. In contrast, conventional gutter brooms 100 require at least three passes to efficiently clean an area. Additionally, gutter broom 100 have a lifetime of at least 2-2.5 longer than the conventional gutter broom. For example, conventional gutter brooms have a lifetime of approximately 30-40 hours before replacement is required. This may be because conventional gutter brooms require multiple passes over difficult areas, e.g., areas with growth for cleaning. Gutter broom 100 includes a 2-2.5 longer lifetime (e.g., 60-80 hours before replacement is required) and additionally includes modular components that can be serviced and/or replaced as needed. The substantial increase in lifetime is, in part, because cleaning of difficult areas with growth is more efficient in the first pass. Testing between gutter broom 100 and conventional gutter brooms included comparing a constant load and RPM on a constant surface, e.g., concrete construction cinder blocks.

In some aspects, second bristles 340 can include swaged cable with poly coating. In some aspects, based on testing, unraveled cable comprising second bristles 340 perform better than conventional gutter broom inserts with respect to cleaning efficiency in areas comprising growing (g., vegetation and/or dirt/mud cleaning). In these aspects, based on testing, broom segment 200 can remain intact and undamaged.

It is to be appreciated that the Detailed Description section, and not the Summary and Abstract sections, is intended to be used to interpret the claims. The Summary and Abstract sections may set forth one or more but not all exemplary aspects of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific aspects will so fully reveal the general nature of the invention that others can, by applying knowledge within the skill of the art, readily modify and/or adapt for various applications such specific aspects, without undue experimentation, without departing from the general concept of the present invention. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary aspects, but should be defined only in accordance with the following claims and their equivalents.

What is claimed is:

1. A block segment for a gutter broom, comprising:

an outer edge;

an inner edge opposite the outer edge;

bristles comprising first bristles having a first stiffness and second bristles having a second stiffness greater than the first stiffness; and openings comprising the bristles and arranged in an outer row adjacent the outer edge and an inner row adjacent the inner edge, the outer row comprising at least two adjacent outer row openings having the first bristles and at least two adjacent outer row openings having the second bristles, the adjacent outer row openings having the first bristles being adjacent the adjacent outer row openings having the second bristles, and the inner row comprising at least two adjacent inner row openings having the first bristles, the adjacent inner row openings having the first bristles being adjacent the adjacent outer row openings having the second bristles, wherein the bristles comprise a greater number of individual first bristles than individual second bristles.

2. The block segment of claim 1, wherein the adjacent inner row openings having the first bristles are adjacent the adjacent outer row openings having the first bristles.

3. The block segment of claim 1, wherein a greater number of inner row openings comprises the first bristles than the number of outer row openings that comprises the first bristles.

4. The block segment of claim 1, wherein the outer row comprises a greater number of individual first bristles than individual second bristles.

5. The block segment of claim 1, wherein the outer row of openings comprises four adjacent outer row openings having the first bristles.

6. The block segment of claim 1, wherein the outer row of openings comprises at least eight openings having the second bristles.

7. A block segment for a gutter broom, comprising:

an outer edge;

an inner edge opposite the outer edge;

bristles comprising first bristles having a first stiffness and second bristles having a second stiffness greater than the first stiffness; and openings comprising the bristles, an outer row of openings disposed between the outer edge and the inner edge comprising at least two adjacent outer row openings having the first bristles, a first group of at least two adjacent outer row openings having the second bristles, and a second group of at least two adjacent outer row openings having the second bristles, the adjacent outer row openings having the first bristles being between the first group and the second group, wherein the bristles comprise a greater number of individual first bristles than individual second bristles.

8. The block segment of claim 7, wherein an inner row of openings inside the outer row comprises at least two adjacent inner row openings having the first bristles.

9. The block segment of claim 8, wherein the adjacent inner row openings having the first bristles are adjacent at least one of the first group, the second group, and the adjacent outer row openings having the first bristles.

10. The block segment of claim 8, wherein the inner row of openings comprises a greater number of individual first bristles than individual second bristles.

11. The block segment of claim 8, wherein a greater number of inner row openings comprises the first bristles than the number of outer row openings that comprises the first bristles.

12. The block segment of claim 7, wherein the adjacent outer row openings having the first [bristle is] *bristles are* in a first group, the outer row of openings further comprising a second group of adjacent outer row openings having the first bristles.

13. The block segment of claim 12, wherein the first group of the adjacent outer row openings having the first bristles is disposed between the first group of the adjacent outer row openings having the second bristles and the second group of the adjacent outer row openings having the second bristles, and wherein the second group of the adjacent outer row openings having the first bristles is adjacent the second group of the adjacent outer row openings having the second bristles.

14. A gutter broom, comprising:

an outer edge;

an inner edge opposite the outer edge;

bristles comprising first bristles having a first stiffness and second bristles having a second stiffness greater than the first stiffness; and openings comprising the bristles, an outer row of openings disposed between the outer edge and the inner edge comprising at least three adjacent outer row openings having the first bristles and at least two adjacent outer row openings having the second bristles, wherein the bristles comprise a greater number of individual first bristles than individual second bristles.

15. The gutter broom of claim 14, wherein the adjacent outer row openings having the first bristles are adjacent the adjacent outer row openings having the second bristles.

16. The gutter broom of claim 14, wherein the outer row of openings comprises four adjacent outer row openings having the second bristles.

17. The gutter broom of claim 14, wherein the adjacent outer row openings having the second bristle is in a first group, the outer row of openings further comprising a second group of adjacent outer row openings having the second bristles, and wherein the adjacent outer row openings having the first bristles is disposed between the first group and the second group.

18. The gutter broom of claim 17, further comprising a third group of adjacent outer row openings having the second bristles and a fourth group of adjacent outer row openings having the second bristles, wherein the adjacent outer row openings having the first bristles are disposed between the third group and the fourth group.

19. The gutter broom of claim 14, wherein the adjacent outer row openings having the second bristles are adjacent a proximal edge of the [block segment] *gutter broom*.

*20. A block segment for a gutter broom, comprising:*

*an outer edge;*

*an inner edge radially inward from the outer edge;*

*bristles comprising first bristles having a first stiffness and second bristles having a second stiffness greater than the first stiffness, the bristles comprising a greater number of individual first bristles than individual second bristles;*

*openings arranged in the block segment in a thickness direction from a top surface of the block segment to a bottom surface of the block segment, wherein the first bristles are positioned in the openings; and*

*a bristle receptacle integrally formed with the block segment by injection molding, the bristle receptacle being positioned radially outward from the openings, wherein the second bristles are retained by the bristle receptacle.*

*21. The block segment of claim 20, wherein the block segment further comprises:*

*a second bristle receptacle spaced from the bristle receptacle along the outer edge of the block segment, wherein the second bristles are retained by the bristle receptacle and the second bristle receptacle.*

*22. The block segment of claim 20, wherein the bristle receptacle protrudes radially outward from the outer edge of the block segment.*

*23. The block segment of claim 20, wherein the bristle receptacle is internal to the outer edge.*

*24. The block segment of claim 20, wherein the bristle receptacle defines a cavity extending through the bristle receptacle in the thickness direction from the top surface of the block segment to a bottom surface of the bristle receptacle.*

*25. The block segment of claim 24, wherein the cavity extends at an angle from an axis generally parallel to a central axis of the gutter broom.*

*26. The block segment of claim 24, wherein the second bristles are retained in the cavity by an interference fit.*

*27. The block segment of claim 20, wherein the first bristles comprise a first thickness, and the second bristles comprise a second thickness greater than the first thickness.*

*28. The block segment of claim 20, wherein the openings are arranged in a row.*

*29. The block segment of claim 28, wherein the openings are arranged in a second row positioned radially inward from the row of openings.*

*30. A block segment for a gutter broom, comprising:*

*an outer edge;*

*an inner edge radially inward from the outer edge;*

*bristles comprising first bristles having a first stiffness and second bristles having a second stiffness greater than the first stiffness, the bristles comprising a greater number of individual first bristles than individual second bristles;*

*openings arranged in the block segment in a thickness direction from a top surface of the block segment to a bottom surface of the block segment, wherein the first bristles are positioned in the openings; and*

*a bristle receptacle formed with the block segment such that the bristle receptacle and block segment are unitary, the bristle receptacle being positioned radially outward from the openings, wherein the second bristles are retained by the bristle receptacle.*

*31. The block segment of claim 30, wherein the bristle receptacle protrudes radially outward from the outer edge of the block segment.*

*32. The block segment of claim 30, wherein the bristle receptacle is formed with the block segment by injection molding, and*

*wherein the openings are arranged in a row.*

*33. The block segment of claim 30, wherein the bristle receptacle defines a cavity extending through the bristle receptacle in the thickness direction from the top surface of the block segment to the bottom surface of the block segment.*

*34. The block segment of claim 33, wherein the cavity extends at an angle from an axis generally parallel to a central axis of the gutter broom.*

*35. The block segment of claim 30, wherein the openings are arranged in a row, and the openings are arranged in a second row positioned radially inward from the row of openings.*

* * * * *